United States Patent
Li et al.

(10) Patent No.: US 12,542,622 B2
(45) Date of Patent: Feb. 3, 2026

(54) CYCLIC REDUNDANCY CHECK FOR STAIRCASE DECODING PROCEDURES

(71) Applicant: QUALCOMM Incorporated, San Diego, CA (US)

(72) Inventors: Jian Li, Shanghai (CN); Changlong Xu, Beijing (CN); Kangqi Liu, San Diego, CA (US); Liangming Wu, Beijing (CN); Kexin Xiao, Shanghai (CN); Wei Liu, Beijing (CN); Ruiming Zheng, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/715,918

(22) PCT Filed: Feb. 25, 2022

(86) PCT No.: PCT/CN2022/077952
§ 371 (c)(1),
(2) Date: Jun. 3, 2024

(87) PCT Pub. No.: WO2023/159475
PCT Pub. Date: Aug. 31, 2023

(65) Prior Publication Data
US 2025/0038881 A1 Jan. 30, 2025

(51) Int. Cl.
*H04L 1/00* (2006.01)
*H03M 13/00* (2006.01)
(Continued)

(52) U.S. Cl.
CPC ............ *H04L 1/0009* (2013.01); *H04L 1/244* (2013.01); *H03M 13/00* (2013.01)

(58) Field of Classification Search
CPC .. H04L 1/0009; H04L 1/244; H03M 13/2927; H03M 13/2906; H03M 13/1515; H03M 13/09; H03M 13/19; H03M 13/152
See application file for complete search history.

(56) References Cited

U.S. PATENT DOCUMENTS

| 7,363,573 B1 | 4/2008 | Bataineh |
| 2018/0205395 A1 | 7/2018 | Nammi |

(Continued)

FOREIGN PATENT DOCUMENTS

| CN | 103795497 A | 5/2014 |
| CN | 107026709 A | 8/2017 |

(Continued)

OTHER PUBLICATIONS

International Search Report and Written Opinion—PCT/CN2022/077952—ISA/EPO—Nov. 29, 2022.

(Continued)

*Primary Examiner* — Justin R Knapp
(74) *Attorney, Agent, or Firm* — Holland & Hart LLP /Qualcomm

(57) ABSTRACT

Methods, systems, and devices for wireless communications are described. A receiving device may receive an encoded signal including a set of information blocks. Each information block may include a set of encoded information bits and a set of cyclic redundancy check (CRC) bits. The receiving device may perform a staircase decoding procedure to decode the set of encoded information bits of a selected information block that is part of a subset of the set of information blocks that is within a sliding window. The staircase decoding procedure may include one or more iterations of a decoding process applied to the subset of the set of information blocks. The receiving device may perform, inbetween iterations of the staircase decoding procedure applied to the subset of the set of information blocks (Continued)

within the sliding window, a CRC procedure based on the set of CRC bits in the set of information blocks.

24 Claims, 12 Drawing Sheets

(51) Int. Cl.
  *H03M 13/15* (2006.01)
  *H03M 13/29* (2006.01)
  *H04L 1/24* (2006.01)

(56) References Cited

U.S. PATENT DOCUMENTS

| | | | |
|---|---|---|---|
| 2018/0227076 A1* | 8/2018 | Koike-Akino | H03M 13/353 |
| 2019/0036550 A1 | 1/2019 | Koike-Akino | |
| 2020/0220653 A1 | 7/2020 | Yin et al. | |
| 2022/0278698 A1* | 9/2022 | Koike-Akino | G06F 13/4027 |

FOREIGN PATENT DOCUMENTS

| | | |
|---|---|---|
| CN | 208956063 U | 6/2019 |
| CN | 112202454 A | 1/2021 |
| WO | WO-2021056399 A1 | 4/2021 |

OTHER PUBLICATIONS

Hager C., et al., "Miscorrection-free Decoding of Staircase Codes", 2017 European Conference on Optical Communication (ECOC), IEEE, Sep. 17, 2017, 3 Pages, XP033336292, The Whole Document.

Kukieattikool P., et al., "Staircase Codes for High-Rate Wireless Transmission on Burst-Error Channels", IEEE Wireless Communications Letters, IEEE, Piscataway, NJ, USA, vol. 5, No. 2, Apr. 1, 2016, pp. 128-131, XP0933285370.

Kukieattikool P., et al., "Variable-rate staircase codes with RS component codes for optical wireless transmission", Transactions on Emerging Telecommunications Technologies, GB, vol. 28, No. 4, May 19, 2016, pp. 1-16, XP0933328537.

Qiu Mi., et al., "Terminated Staircase Codes for NAND Flash Memories", IEEE Transactions on Communications, IEEE Service Center, Piscataway, NJ. USA, vol. 66, No. 12, Dec. 1, 2018, pp. 5861-5875, XP011700381.

Supplementary European Search Report EP22927761 Search Authority Munich Nov. 5, 2025.

* cited by examiner

400

401

402

- Information bits 405
- Parity bits 410
- Cyclic redundancy check bits 420

CYCLIC REDUNDANCY CHECK FOR STAIRCASE DECODING PROCEDURES

CROSS REFERENCE

The present application is a 371 national phase filing of International PCT Application No. PCT/CN2022/077952 by LI et al., entitled "TECHNIQUES FOR IMPLEMENTING AN ITERATIVE CODING PROCEDURE," filed Feb. 25, 2022, which is assigned to the assignee hereof, and which is expressly incorporated by reference in its entirety herein.

FIELD OF TECHNOLOGY

The following relates to wireless communications, including techniques for implementing an iterative coding procedure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities or one or more network access nodes, each simultaneously supporting communication for multiple communication devices, which may be otherwise known as user equipment (UE).

In some wireless communications systems, wireless devices may communicate with one another, where the communications may include an encoded signal. For example, a transmitting device may encode a signal in accordance with a coding technique and the transmitting device may transmit the encoded signal to a receiving device. Upon receiving the encoded signal, the receiving device may perform a corresponding decoding technique to obtain the original signal. Signal coding techniques may be improved.

SUMMARY

The described techniques relate to improved methods, systems, devices, and apparatuses that support techniques for implementing an iterative coding procedure. Generally, the described techniques provide for improved methods of coding a signal by a transmitting device and decoding the signal by a receiving device. The transmitting device and the receiving device may be configured to perform iterative coding procedures (e.g., staircase coding). To improve reliability and increase efficiency of the iterative coding procedure, the transmitting device may be configured to calculate and include cyclic redundancy check (CRC) bits in one or more information blocks of an encoded signal. Accordingly, the receiving device may receive the encoded signal and perform an iterative decoding procedure to obtain the original signal. The receiving device may perform a CRC procedure at one or more instances throughput the iterative decoding procedure which may allow the receiving device to improve reliability of the decoding procedure, and in some cases, may allow the receiving device to shorten one or more iterations if the iterative encoding procedure.

For example, a transmitting device may calculate a set of CRC bits to include in each information block of a set of information blocks, and perform an iterative encoding procedure (e.g., staircase encoding) to encode a set of information bits for each information block of the set of information blocks. The transmitting device may transmit an encoded signal including the set of information blocks, where each information block of the set of information blocks may include at least the set of encoded information bits and the set of CRC bits. Accordingly, a receiving device may receive the encoded signal and perform an iterative decoding procedure (e.g., staircase decoding) to decode the set of encoded information bits of a selected information block that is part of a subset of the set of information blocks that is within a sliding window. The iterative decoding procedure may include one or more iterations of a decoding process applied to the subset of the set of information blocks. Additionally, the receiving device may perform, in between iterations of the iterative decoding procedure applied to the subset of the set of information blocks within the sliding window, a CRC procedure based on the set of CRC bits in individual ones of the subset of the set of information blocks.

A method for wireless communications at a receiving device is described. The method may include receiving an encoded signal including a set of information blocks, where each information block of the set of information blocks includes a set of encoded information bits and a set of CRC bits, performing a staircase decoding procedure to decode the set of encoded information bits of a selected information block that is part of a subset of the set of information blocks that is within a sliding window, the staircase decoding procedure including one or more iterations of a decoding process applied to the subset of the set of information blocks, and performing, in between iterations of the staircase decoding procedure applied to the subset of the set of information blocks within the sliding window, a CRC procedure based on the set of CRC bits in individual ones of the subset of the set of information blocks.

An apparatus for wireless communications is described. The apparatus may include a processor, memory coupled with the processor, and instructions stored in the memory. The instructions may be executable by the processor to cause the apparatus to receive an encoded signal including a set of information blocks, where each information block of the set of information blocks includes a set of encoded information bits and a set of CRC bits, perform a staircase decoding procedure to decode the set of encoded information bits of a selected information block that is part of a subset of the set of information blocks that is within a sliding window, the staircase decoding procedure including one or more iterations of a decoding process applied to the subset of the set of information blocks, and perform, in between iterations of the staircase decoding procedure applied to the subset of the set of information blocks within the sliding window, a CRC procedure based on the set of CRC bits in individual ones of the subset of the set of information blocks.

Another apparatus for wireless communications is described. The apparatus may include means for receiving an encoded signal including a set of information blocks, where each information block of the set of information blocks includes a set of encoded information bits and a set of CRC bits, means for performing a staircase decoding procedure to decode the set of encoded information bits of a selected information block that is part of a subset of the set of information blocks that is within a sliding window, the staircase decoding procedure including one or more iterations of a decoding process applied to the subset of the set of information blocks, and means for performing, in between iterations of the staircase decoding procedure applied to the subset of the set of information blocks within the sliding window, a CRC procedure based on the set of CRC bits in individual ones of the subset of the set of information blocks.

A non-transitory computer-readable medium storing code for wireless communications is described. The code may include instructions executable by a processor to receive an encoded signal including a set of information blocks, where each information block of the set of information blocks includes a set of encoded information bits and a set of CRC bits, perform a staircase decoding procedure to decode the set of encoded information bits of a selected information block that is part of a subset of the set of information blocks that is within a sliding window, the staircase decoding procedure including one or more iterations of a decoding process applied to the subset of the set of information blocks, and perform, in between iterations of the staircase decoding procedure applied to the subset of the set of information blocks within the sliding window, a CRC procedure based on the set of CRC bits in individual ones of the subset of the set of information blocks.

Some examples of the method, apparatuses, and non-transitory computer-readable medium described herein may further include operations, features, means, or instructions for identifying that the selected information block successfully passes the CRC procedure and identifying an output for the selected information block based on the CRC procedure for the selected information block being successful, where the output includes a set of decoded information bits.

Some examples of the method, apparatuses, and non-transitory computer-readable medium described herein may further include operations, features, means, or instructions for determining that the selected information block successfully passes the CRC procedure after less than a predetermined maximum number of the one or more iterations of the decoding process and refraining to perform a remaining number of the one or more iterations of the decoding process based on the selected information block successfully passing the CRC procedure before the predetermined maximum number of the one or more iterations may be performed.

Some examples of the method, apparatuses, and non-transitory computer-readable medium described herein may further include operations, features, means, or instructions for moving the sliding window to select a next information block of the set of information blocks and to include a second subset of the set of information blocks to perform the staircase decoding procedure to decode the set of encoded information bits of the next information block that may be part of a second subset of the set of information blocks, where moving the sliding window may be based on the CRC procedure for the selected information block being successful.

Some examples of the method, apparatuses, and non-transitory computer-readable medium described herein may further include operations, features, means, or instructions for identifying that the selected information block fails to successfully pass the CRC procedure and performing a next iteration of the one or more iterations of the decoding process based on the CRC procedure of the selected information block being unsuccessful.

Some examples of the method, apparatuses, and non-transitory computer-readable medium described herein may further include operations, features, means, or instructions for identifying that a first information block of the subset of the set of information blocks other than the selected information block successfully passes the CRC procedure and configuring the first information block to fix at least a set of decoded information bits in the first information block, the fixed set of decoded information bits to remain unchanged for a remainder of the staircase decoding procedure, where fixing the set of decoded information bits in the first information block may be based on the CRC procedure of the first information block being successful.

In some examples of the method, apparatuses, and non-transitory computer-readable medium described herein, performing the staircase decoding procedure and the CRC procedure may include operations, features, means, or instructions for performing the staircase decoding procedure and the CRC procedure until an output for each information block of the set of information blocks may be achieved.

In some examples of the method, apparatuses, and non-transitory computer-readable medium described herein, each CRC bit of the set of CRC bits may be arranged in a single column of the selected information block.

In some examples of the method, apparatuses, and non-transitory computer-readable medium described herein, each CRC bit of the set of CRC bits may be arranged in a single row of the selected information block.

In some examples of the method, apparatuses, and non-transitory computer-readable medium described herein, each CRC bit of the set of CRC bits may be arranged such that each row and each column of an information block of the set of information blocks includes at most one CRC bit.

In some examples of the method, apparatuses, and non-transitory computer-readable medium described herein, the set of CRC bits included in each information block includes 16 bits, 24 bits, or 32 bits.

In some examples of the method, apparatuses, and non-transitory computer-readable medium described herein, the staircase decoding procedure includes performing row decoding and column decoding for the subset of the set of information blocks within the sliding window.

A method for wireless communications at a transmitting device is described. The method may include calculating a set of CRC bits to include in each information block of a set of information blocks, performing a staircase encoding procedure to encode a set of information bits for each information block of the set of information blocks, and transmitting an encoded signal including the set of information blocks, where each information block of the set of information blocks includes at least the set of encoded information bits and the set of CRC bits.

An apparatus for wireless communications is described. The apparatus may include a processor, memory coupled with the processor, and instructions stored in the memory. The instructions may be executable by the processor to cause the apparatus to calculate a set of CRC bits to include in each information block of a set of information blocks, perform a staircase encoding procedure to encode a set of information bits for each information block of the set of information blocks, and transmit an encoded signal including the set of information blocks, where each information block of the set of information blocks includes at least the set of encoded information bits and the set of CRC bits.

Another apparatus for wireless communications is described. The apparatus may include means for calculating a set of CRC bits to include in each information block of a set of information blocks, means for performing a staircase encoding procedure to encode a set of information bits for each information block of the set of information blocks, and means for transmitting an encoded signal including the set of information blocks, where each information block of the set of information blocks includes at least the set of encoded information bits and the set of CRC bits.

A non-transitory computer-readable medium storing code for wireless communications is described. The code may include instructions executable by a processor to calculate a set of CRC bits to include in each information block of a set of information blocks, perform a staircase encoding procedure to encode a set of information bits for each information block of the set of information blocks, and transmit an encoded signal including the set of information blocks, where each information block of the set of information blocks includes at least the set of encoded information bits and the set of CRC bits.

Some examples of the method, apparatuses, and non-transitory computer-readable medium described herein may further include operations, features, means, or instructions for arranging each CRC bit of the set of CRC bits in a single column of an information block of the set of information blocks.

Some examples of the method, apparatuses, and non-transitory computer-readable medium described herein may further include operations, features, means, or instructions for arranging each CRC bit of the set of CRC bits in a single row of an information block of the set of information blocks.

Some examples of the method, apparatuses, and non-transitory computer-readable medium described herein may further include operations, features, means, or instructions for arranging each CRC bit of the set of CRC bits such that each row and each column of an information block of the set of information blocks includes at most one CRC bit.

In some examples of the method, apparatuses, and non-transitory computer-readable medium described herein, the set of CRC bits included in each information block includes 16 bits, 24 bits, or 32 bits.

In some examples of the method, apparatuses, and non-transitory computer-readable medium described herein, the staircase encoding procedure includes row encoding and column encoding the set of information bits for each information block of the set of information blocks.

DETAILED DESCRIPTION

Figure 1:
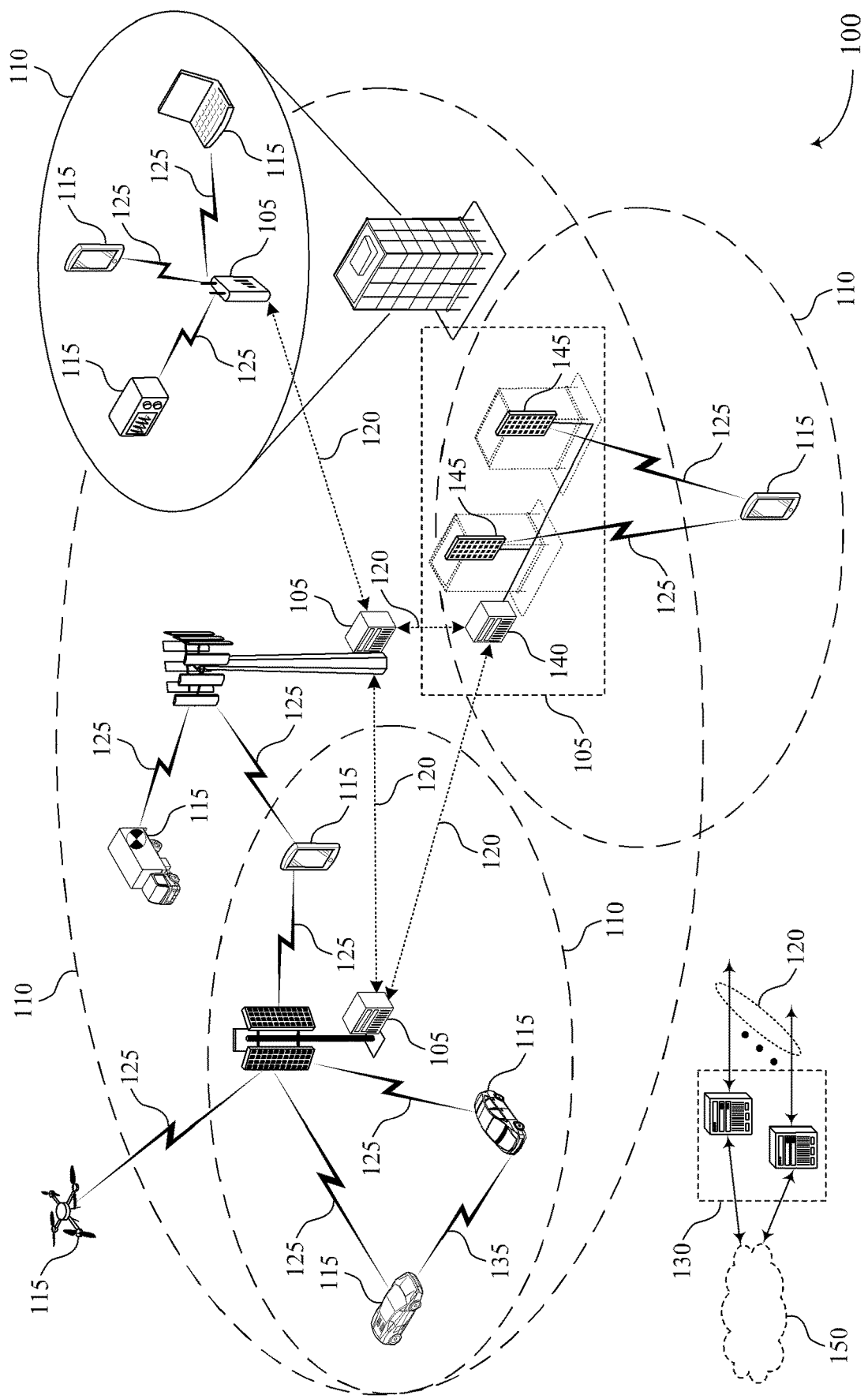
FIG. 1 illustrates an example of a wireless communications system that supports techniques for implementing an iterative coding procedure in accordance with aspects of the present disclosure.

In some wireless communications systems, wireless devices may transmit and receive encoded signals. For example, a transmitting device may encode a set of information blocks using an iterative coding procedure (e.g., staircase encoding). Staircase encoding may implement a type of forward error correction (FEC) encoding in which the transmitting device encodes the set of information blocks using a staircase pattern. For example, a first information block (e.g., information block 0) may be configured to the left of a second information block (e.g., information block 1), a third information block (e.g., information block 2) may be configured directly below the second information block, a fourth information block (e.g., information block 3) may be configured to the right of the third information block, and so on. The encoder may then encode row by row for the first "staircase step" and then encode column by column for the first staircase step. The encoder may then encode row by row for the second "staircase step" and then encode column by column for the second staircase step, and so on. Upon encoding the signal, the transmitting device may transmit the encoded signal to one or more receiving devices.

A receiving device may receive the encoded signal iteratively decode the set of information blocks in accordance with a decoding procedure corresponding to the encoding procedure used by the transmitting device. For example, in the case of staircase decoding, the encoded information blocks may be arranged in a staircase configuration and the receiving device may decode the set of information blocks in accordance with a sliding window. For example, the receiving device may row-decode and column-decode a first subset (e.g., a first window) of the information blocks included in the encoded signal (e.g., information blocks 0 through W). Information block 0 may refer to a reference block, such as a block of zeros, or some other bit combination known to the receiving device and W may refer to the size of the sliding window (in information blocks)). The receiving device may be configured to row decode and column decode for a configured number of iterations to obtain an output for information block 1 (e.g., the next information block after the reference information block 0).

Then, the receiving device may slide the window one block to the right to perform the same procedure with a second subset of information blocks (e.g., a second window). For example, the second subset may include information blocks 1 through W+1, where information block 1 may be the new reference block as the output was obtained in the first decoding procedure. The receiving device may perform the decoding procedure for the second subset of information blocks for a configured number of iterations to obtain an output for information block 2 (e.g., the next information block after the reference information block 1), and so on until the receiving device decodes each information block of the set of information blocks.

Staircase coding may result in low decoding complexity and improved performance but a decoder may be configured to perform the decoding procedure for each block in the sliding window for the configured number of iterations before moving on to the next iteration, even if the correct output is determined prior to the last configured iteration. Additionally, in some cases, an information block may reach a correct output during a sliding window associated with another information block, and so when iteration decoding is continued, the decoding procedure may change the correct block because the decoder is unable to recognize that it reached the correct decoding of that block already.

To improve iterative coding techniques, a transmitting device may be configured to include cyclic redundancy check (CRC) bits in the staircase code such that each information block is configured to include a set of one or more CRC bits. The transmitting device may include the set of CRC bits in a single row of an information block, in a single column of the information block, or such that not more than one CRC bit is included in each row and each column of a block. For example, the transmitting device may configure the CRC bits in the diagonal of an information block.

Accordingly, a receiving device may receive the set of information blocks, each including a set of CRC bits and perform staircase decoding. During the decoding procedure of a current sliding window, the receiving device may check the CRC bits of each information block in the current sliding window. If the set of CRC bits for an information block passes the CRC procedure, then the receiving device may fix the information block so that the code in the fixed information block will not be changed during the rest of the decoding procedure (e.g., in future iterations and/or in future sliding windows). Additionally, if the information block that is the focus of the current sliding window passes the CRC (e.g., information block 1 of the first window, or information block 2 of the second window, for example), then the decoding process of the current sliding window may stop without performing each of the remaining configured iterations. The receiving device may then slide the window one block to the right and continue the decoding procedure to obtain an output of the next information block in the set.

Particular aspects of the subject matter described herein may be implemented to realize one or more advantages. The described techniques may support improvements in iterative decoding procedures may improving reliability, and increasing efficiency, among other advantages. As such, supported techniques may include improved network operations and, in some examples, may promote network efficiencies, among other benefits.

Aspects of the disclosure are initially described in the context of wireless communications systems. Aspects are the described with reference to an example iterative decoding procedure, example information block formats, and an example process flow. Aspects of the disclosure are further illustrated by and described with reference to apparatus diagrams, system diagrams, and flowcharts that relate to techniques for implementing an iterative coding procedure.

FIG. 1 illustrates an example of a wireless communications system 100 that supports techniques for implementing an iterative coding procedure in accordance with aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The network entities 105 may be dispersed throughout a geographic area to form the wireless communications system 100 and may be devices in different forms or having different capabilities. The network entities 105 and the UEs 115 may wirelessly communicate via one or more communication links 125. Each network entity 105 may provide a coverage area 110 over which the UEs 115 and the network entity 105 may establish one or more communication links 125. The coverage area 110 may be an example of a geographic area over which a network entity 105 and a user equipment (UE) 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, network entity 105, entity of a core network 130, apparatus, device, or computing system configured to perform any techniques described herein. For example, a network node may be a UE 115. As another example, a network node may be a network entity 105. As another example, a first network node may be configured to communicate with a second network node or a third network node. In one aspect of this example, the first network node may be a UE 115, the second network node may be a network entity 105, and the third network node may be a UE 115. In another aspect of this example, the first network node may be a UE 115, the second network node may be a network entity 105, and the third network node may be a network entity 105. In yet other aspects of this example, the first, second, and third network nodes may be different. Similarly, reference to a UE 115, a network entity 105, an apparatus, a device, or a computing system may include disclosure of the UE 115, network entity 105, apparatus, device, or computing system being a network node. For example, disclosure that a UE 115 is configured to receive information from a network entity 105 also discloses that a first network node is configured to receive information from a second network node. In this example, consistent with this disclosure, the first network node may refer to a first UE 115, a first network entity 105, a first apparatus, a first device, or a first computing system configured to receive the information; and the second network node may refer to a second UE 115, a second network entity 105, a second apparatus, a second device, or a second computing system.

The network entities 105 may communicate with the core network 130, or with one another, or both. For example, the network entities 105 may interface with the core network 130 through one or more backhaul links 120 (e.g., via an S1, N2, N3, or other interface). The network entities 105 may communicate with one another over the backhaul links 120 (e.g., via an X2, Xn, or other interface) either directly (e.g., directly between network entities 105), or indirectly (e.g., via core network 130), or both. In some examples, the backhaul links 120 may be or include one or more wireless links.

One or more of the network entities 105 described herein may include or may be referred to by a person having ordinary skill in the art as a base transceiver station, a radio network entity, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay network entities, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a ULE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In other cases, D2D communications are carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g., radio heads and ANCs) or consolidated into a single network device (e.g., a network entity 105, a base station 105, a network node 105). A network entity 105, an access network entity 140, and the one or more other access network transmission entities 145 may each be, individually or collectively, referred to as network entities.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more network entity antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, such as wireless communications system 100 (e.g., an optical transport network, a 5G network, a 6G network, or any other network), a transmitting device (e.g., a UE 115, a network entity 105, a base station, a node, any other network device) may calculate a set of CRC bits to include in each information block of a set of information blocks, and perform an iterative encoding procedure (e.g., staircase encoding) to encode a set of information bits for each information block of the set of information blocks. The transmitting device may transmit an encoded signal including the set of information blocks, where each information block of the set of information blocks may include at least the set of encoded information bits and the set of CRC bits. Accordingly, a receiving device (e.g., a UE 115, a network entity 105, a base station, a node, any other network device) may receive the encoded signal and perform an iterative decoding procedure (e.g., staircase decoding) to decode the set of encoded information bits of a selected information block that is part of a subset of the set of information blocks that is within a sliding window. The iterative decoding procedure may include one or more iterations of a decoding process applied to the subset of the set of information blocks. Additionally, the receiving device may perform, in between iterations of the iterative decoding procedure applied to the subset of the set of information blocks within the sliding window, a CRC procedure based on the set of CRC bits in individual ones of the subset of the set of information blocks.

Figure 2:
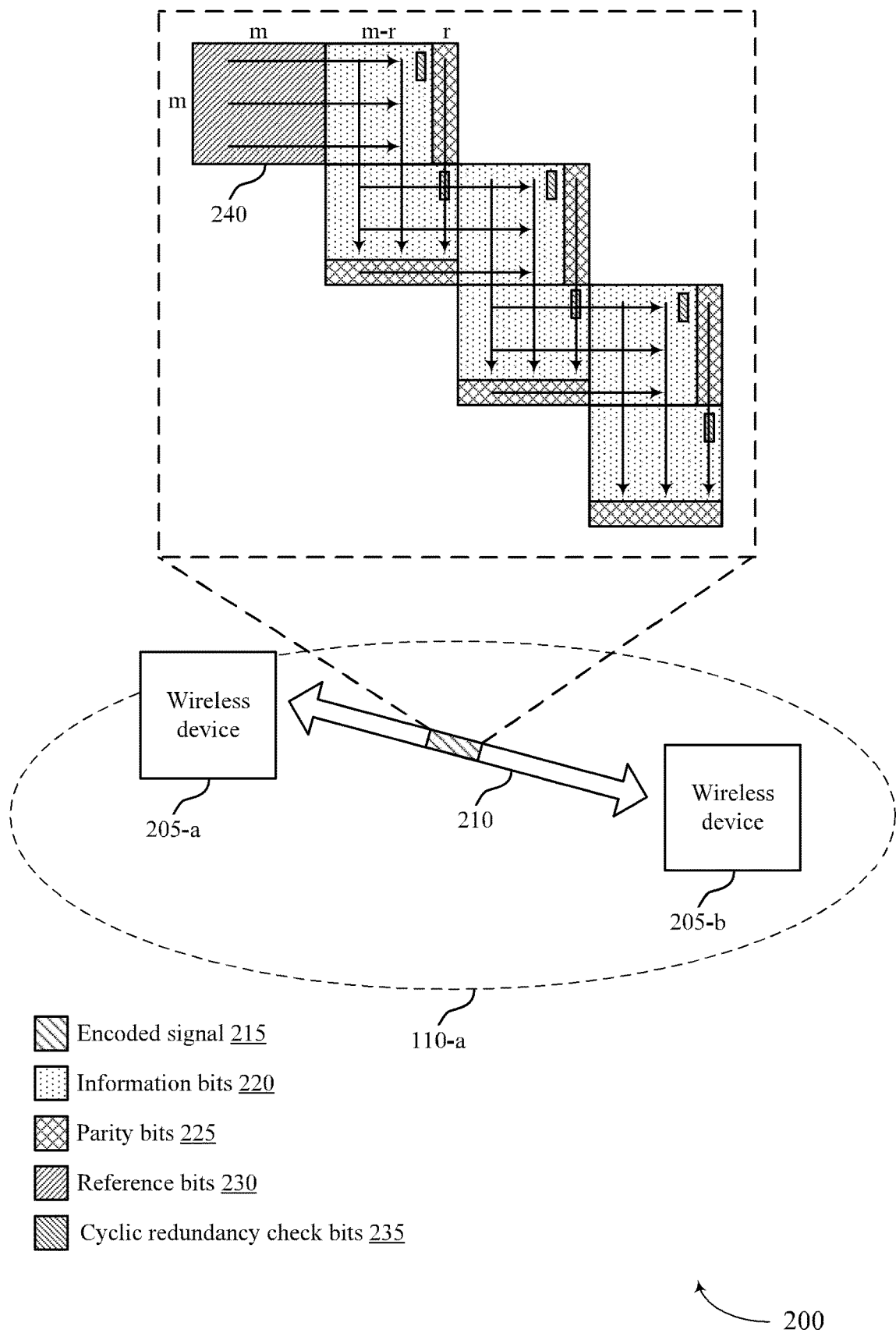
FIG. 2 illustrates an example of a wireless communications system that supports techniques for implementing an iterative coding procedure in accordance with aspects of the present disclosure.

FIG. 2 illustrates an example of a wireless communications system 200 that supports techniques for implementing an iterative coding procedure in accordance with aspects of the present disclosure. The wireless communications system 200 may include wireless device 205-$a$ and wireless device 205-$b$, which may each be a UE, a network entity, a network node, or some other network device. Wireless device 205-$a$ and 205-$b$ may be examples of devices as described with reference to FIG. 1. In some cases, one, both, or neither of wireless devices 205-$a$ and 205-$b$ may serve a geographic coverage area 110-$a$. In some cases, wireless devices 205-$a$ and 205-$b$ may implement an iterative coding procedure in communications with one another or other devices. In some cases, wireless device 205-$a$ may be a transmitting device and wireless device 205-$b$ may be a receiving device, or vice versa.

Wireless devices 205-$a$ and 205-$b$ may communicate with one another via a communication link 210 (e.g., a sidelink communication link, a downlink communication link, an uplink communication link), which may otherwise be referred to as a channel, a beam, etc. In some cases, a wireless device 205 may code messages prior to transmitting the message to another wireless device 205, such as to ensure security of the transmission. For example, a transmitting device (e.g., wireless device 205-$a$, wireless device 205-$b$) may encode a set of information blocks 240 using an iterative coding procedure (e.g., staircase encoding), where an information block may be a matrix (e.g., m×m) of bits including at least one or more information bits 220 (e.g., m-r information bits, m-r information symbols) and one or more parity bits 225 (e.g., r parity symbols, r parity bits). Staircase encoding may implement a type of FEC encoding (e.g., Hamming, Bose-Chaudhuri-Hocquenghem (BCH), Reed-Solomon) and encode the set of information blocks using a staircase pattern, as depicted in FIG. 2. For example, a first information block 240 (e.g., information block 0) is configured to the left of a second information block 240 (e.g., information block 1), a third information block 240 (e.g., information block 2) is configured directly below the second information block 240, a fourth information block 240 (e.g., information block 3) is configured to the right of the third information block 240, and so on to form a "staircase".

The encoder (e.g., the transmitting device, an encoder of the transmitting device) may then encode row by row for the first "staircase step" of length 2$m$ (e.g., the first information block and the second information block) and then encode column by column for the first staircase step. For example, the encoder may encode the first row of the first step, then encode the second row, and so on up to the m rows of the first step, then the encoder may similarly encode column by column of the first step. The encoder may then encode row by row for the second "staircase step" (e.g., the third information block and the fourth information block) and then encode column by column for the second staircase step, and so on. Upon encoding each information block of the message, the transmitting device may transmit the encoded signal 215 to one or more receiving devices (e.g., wireless device 205-$a$, wireless device 205-$b$). Every row (e.g., the concatenation of the symbols in every row) and every column (e.g., the concatenation of the symbols in every column) in the 'staircase' may be a valid codeword. Accordingly, each step may include m codewords. The staircase code rate may be equal to (m−r)/m, and the component FEC code rate may be equal to (2m−r)/2m.

A receiving device may receive the encoded signal 215 and iteratively decode the set of information blocks 240 in accordance with a decoding procedure corresponding to the encoding procedure used by the transmitting device. For example, in the case of staircase decoding, the encoded information blocks 240 may be arranged in a staircase configuration and the receiving device may decode the set of information blocks 240 in accordance with a sliding window, as described in more detail with reference to FIG. 3. For example, the receiving device may row-decode and column-decode a first subset of the information blocks (e.g., a first sliding window) included in the encoded signal (e.g., information blocks 0 through W). Information block 0 may refer to a reference block and may include a set of reference bits 230, such as a block of zeros, or some other bit combination known to the receiving device and W may refer to the size of the sliding window (e.g., the number of information blocks included in the sliding window). The decoder may decode each row and each column in the current sliding window for a configured number of iterations to obtain an output for information block 1 (e.g., the next information block after the reference information block 0). Then, the receiving device may slide the window one block to the right to perform the same procedure with a second subset of information blocks (e.g., a second sliding window). For example, the second subset may include information blocks 1 through W+1, where information block 1 may be the new reference block as the output was obtained in the first decoding procedure. The receiving device may perform the decoding procedure for the second subset of information blocks for the configured number of iterations to obtain an output for information block 2 (e.g., the next information block after the reference information block 1), and so on until the receiving device decodes each information block of the set of information blocks.

Staircase coding may result in low decoding complexity and improved performance but a decoder may be configured to perform the decoding procedure for each block in the sliding window for the configured number of iterations before moving on to the next iteration. For example, during the first sliding window in which information block 1 is the subject of the decoding procedure, the decoder may successfully decode information block 1 prior to performing all iterations. However, the decoder may not be configured with a way to identify that information block 1 is successfully decoder. Accordingly, the decoder may continue with the decoding procedure for the current sliding window up to the configured iterations, which may result in increased latency of the decoding procedure. Additionally, in some cases, an information block may reach a correct output during a sliding window associated with another information block. For example, for the first sliding window in which information block 1 is the decoding focus (e.g., the subject), the decoder may successfully decode information block 3. However, again, the decoder may not be configured with a way to identify that information block 3 is successfully decoded. Therefore, the decoder may continue the iteration decoding for the configured iterations of the current sliding, which may change the correct block (e.g., information block 3) because the code in each column and each row of the current sliding window may change at each iteration.

To improve iterative coding techniques, a transmitting device may be configured to include CRC bits 235 in the staircase code such that each information block is configured to include a set CRC bits. The transmitting device may include the set of CRC bits in a single row of an information block, in a single column of the information block, or such that not more than one CRC bit is included in each row and each column of a block, as described in more detail with reference to FIGS. 4A, 4B, and 4C. Accordingly, a receiving device may receive the set of information blocks, each including a set of CRC bits 235 and perform staircase decoding.

For example, a CRC-enabled transmitting device may calculate a short, fixed-length binary sequence, known as the check value or CRC, for each block of data (e.g., information block 240) to be sent or stored and appends it to the data, forming a codeword. When a codeword is received or read, the receiving device either compares its check value with one freshly calculated from the data block, or equivalently, performs a CRC on the whole codeword and compares the resulting check value with an expected constant. If the CRC values do not match, then the block contains a data error. The receiving device may take corrective action, such as rereading the block or requesting that all or a portion of the block be sent again. Otherwise, the receiving device data may assume the block to be error-free.

Accordingly, during the decoding procedure of a current sliding window, the receiving device may check the CRC bits 235 in between each iteration, or during an iteration. If the set of CRC bits 235 for an information block passes such that the set of CRC bits 235 matches what the receiving device expects them to be, then the receiving device may fix the information block so that the code in the fixed information block will not be changed in future iterations and in future sliding windows. Additionally, if the information block that is the focus of the current sliding window passes the CRC (e.g., information block 1 for the first sliding window, for example), then the decoding process of the current sliding window will stop without performing each of the remaining configured iterations. The receiving device may then slide the window one block to the right and continue the decoding procedure to obtain an output of the next information block in the set.

For each information block, the information is protected by adding a CRC. Each block has $(m-r)*m$ bits, and among them there are P CRC bits (e.g., parity bits 225). Accordingly, the number of original information bits is $(m-r)*m-P$. For example, in the case that m=510, r=30, and P=32, the CRC overhead is 0.00013.

Accordingly, implementing CRC bits 235 to aid an iterative coding procedure my improve efficiency of the decoding procedure because the receiving device may not perform (e.g., may refrain from performing) unnecessary iterations, and because the receiving device may not perform additional decoding on an information block that is already correctly decoded.

Figure 3:
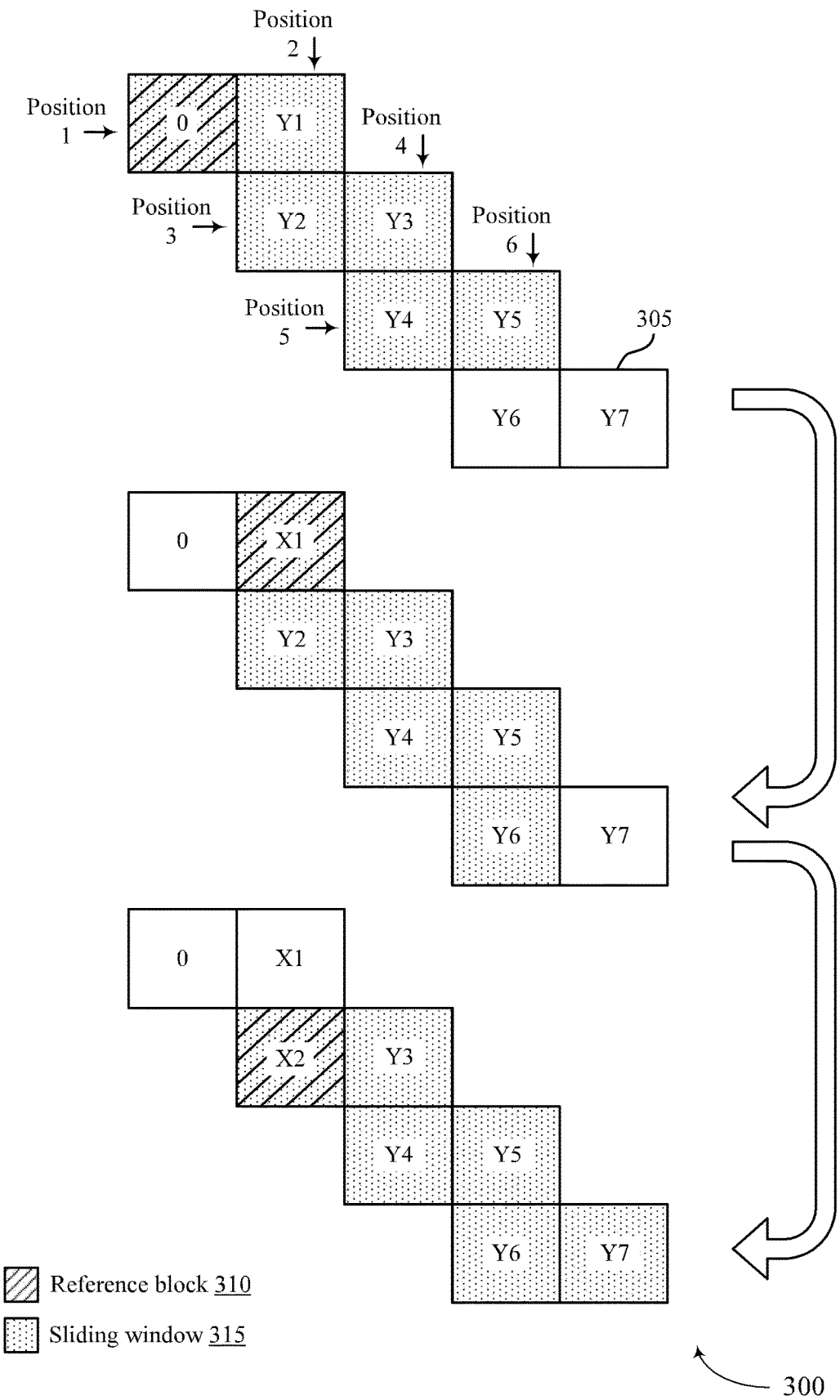
FIG. 3 illustrates an example of an iterative decoding procedure that supports techniques for implementing an iterative coding procedure in accordance with aspects of the present disclosure.

FIG. 3 illustrates an example of an iterative decoding procedure 300 that supports techniques for implementing an iterative coding procedure in accordance with aspects of the present disclosure. The iterative decoding procedure 300 may implemented by a wireless device, which may be a UE, a network entity, a network node, or some other network device. The wireless device may be an example of a device as described with reference to FIGS. 1 and 2. In some cases, the wireless device may implement an iterative decoding procedure based on receiving an encoded signal from another wireless device, such as a UE, a network entity, a network node, or something other network device.

As described herein, a receiving device may receive an encoded signal including one or more information blocks 305 from a transmitting device and may iteratively decode the set of information blocks in accordance with a decoding procedure corresponding to the encoding procedure used by the transmitting device. For example, the receiving device may have encoded the signal using a staircase coding procedure, and so the transmitting device may decode the encoded signal with a staircase decoding procedure. For example, a receiving device may receive an encoded signal including eight information blocks 305, where the eight information blocks 305 may be arranged in a staircase configuration, as depicted in FIG. 3. In some cases, the first information block 305 may be a reference block 310 such as a block of zeros, or some other bit combination known to the receiving device. The other seven information blocks may include information bits (e.g., information symbols), parity bits (e.g., parity symbols), and a set of one or more CRC bits to aid in the iterative decoding procedure. The encoded bits of each block may be represented by Y (e.g., Y1, Y2, Y3). Accordingly, the receiving device may perform the iterative decoding procedure to obtain the original bits (e.g., non-encoded bits), which as the example depicted in FIG. 3, may be represented by X (e.g., Y1 may be decoded to X1, Y2 may be decoded to X2, etc.).

In some implementations, a decoding procedure for staircase codes uses a sliding window. A sliding window 315 may refer to a subset of adjacent information blocks 305 (e.g., consecutively received information blocks), that defines a boundary of the decoding procedure. The number of blocks included in the subset may be represented by W, which may be any number greater than zero. For example, the sliding window may include W received blocks $B_k$, $B_{k+1}, \ldots, B_{k+W-1}$. A sliding window 315 is depicted in FIG. 3, in which W is equal to six. Each component code in the sliding window may be identified by a tuple (i, j), where $i \in \{1, 2, \ldots, W-1\}$ may indicate the position relative to the current decoding window and $j \in \{1, 2, \ldots, a\}$ may enumerate all codes at a particular position. As an example, a component code of (1, 3) may refer to a component code that extends horizontally across blocks 0 and Y1 (e.g., position 1 of the first sliding window 315) in a third row (e.g., a third position) of position 1. In another example, a component code of (4, 4) may refer to a component code that extends vertically down blocks Y3 and Y5 (e.g., position 4 of the first sliding window 315), and in a fourth column (e.g., a fourth position) of the position 4.

In some implementations, the decoding device may be decoded in accordance with Algorithm 1, where k may refer to a specific block 305 of a sliding window 315, l may refer to an iteration number, W may refer to a number of information blocks 305 included in each sliding window 315, i may indicate the position relative to the current decoding window, j may enumerate all codes at a particular position, and a may refer to the block size. A decoding device may be preconfigured with, or receive an indication of $\ell$.

| Algorithm 1: Window decoding of staircase codes |
| --- |
| 1  k ← 0 |
| 2  while true do |
| 3     for l = 1, 2, ..., $\ell$ do |
| 4        for i = W, W − 1, ..., 1 do |
| 5           for j = 1, 2, ..., α do |
| 6              apply BDD to component code (i, j) |
| 7     output decision for $B_k$ and shift window |
| 8     k ← k + 1 |

In accordance with algorithm 1, all component codes (e.g., vertically and horizontally) are decoded $\ell$ times, after which the decoding window shifts to the next position. After the window shifts, the same component code may be identified by a different position index as the position indices are relative to the position of the sliding window 315. In some cases, the receiving device may start from the bottom of a sliding window 315 and decode upwards, such as by row and column decoding starting with the last stairstep of the first sliding window (e.g., block Y4 and Y5), then by moving to the second to last stairstep (e.g., blocks Y2 and Y3), etc. In some cases, the receiving device may start from the top of a sliding window 315 and decode downwards, such as by row and column decoding starting with the first stairstep of the first sliding window (e.g., block 0 and Y1), then by moving to the second stairstep (e.g., blocks Y2 and Y3), etc.

For each sliding window, the first information block 305 after the reference block 310 is the focus of that sliding window, such that an output for that block will be determined during the decoding procedure for the current sliding window. For example, the decoding device may perform the decoding procedure for the first sliding window, where block Y1 is the focus of the first sliding window 315. By the end of the decoding procedure for the first sliding window 315 (e.g., including less than or all of the configured iterations for the decoding procedure), the decoding procedure will output X1 in place of Y1. Then, the decoding device will shift the sliding window 315 one block to the right (e.g., a second sliding window 315) to include blocks X1 through Y6, where X1 may serve as the reference block 310 for the decoding procedure, and Y2 may be the focus of the second sliding window. By the end of the decoding procedure for the second sliding window 315, X2 will be output in place of Y2. Again, the decoding device may shift the sliding window 315 one block to the right (e.g., a third sliding window 315) to include blocks X2 through Y7.

As each information block 305 includes CRC bits (e.g., the information in each block is protected by CRC), as described in more detail with reference to FIGS. 4A, 4B, and 4C, the receiving device may perform the decoding procedure in accordance with Algorithm 1 with the additional step of performing a CRC procedure. In some cases, the receiving device may perform the CRC procedure throughout the decoding procedure. For example, the receiving device may check CRC bits while decoding a sliding window 315. In some other cases, the receiving device may perform the CRC procedure at the end of each iteration. For example, the receiving device may receive the set of eight encoded information blocks 305 and place a first sliding window 315 around W adjacent information blocks, such as block 0 through block Y5 in the case that W is equal to 6. The receiving device may then decode each row and each column for a first iteration of the first sliding window 315. Then, the receiving device may perform the CRC procedure to check the CRC bits in one or more of the blocks of the first sliding window 315.

In some implementations, the receiving device may perform the CRC procedure for each block included in a current sliding window (e.g., block 0 through Y5 of the first sliding window 315). In some implementations, the receiving device may perform the CRC procedure for each block included in a current sliding window 315 minus the reference block (e.g., block Y1 through Y5 of the first sliding window 315).

To perform the CRC procedure, the receiving device may determine (e.g., calculate, receive, look-up) the expected CRC bit value for an information block 305, for a row of an information block 305, for a column of an information block 305, or a combination thereof. The receiving device may then compare the determined value to the actual value in the information block 305, the row, and/or the column. If the actual value matches the determined value, then the actual value is likely not to contain any errors and may represent the original, non-encoded value. If however the actual value does not match the determined value, then the actual value is likely to contain one or more errors.

In some cases, the CRC bits may be used for early termination of the decoder. For example, if the CRC procedure is successful for the information block that is the focus of the sliding window 315 (e.g., block Y1 of the first sliding window), then the decoding device may refrain from performing any additional iterations (e.g., remainder iterations), output X1, and move the sliding window 315 one block to the right. For example, if the decoding device is configured to perform 6 iterations for each sliding window 315, and the decoding device performs a successfully CRC procedure for block Y1 during and/or after the third iteration, then the decoding device may refrain from performing the rest of iterations four through six, and output X1. Therefore, the average iterations performed for each sliding window 315 may be reduced.

In some cases, the CRC bits are used to improve the performance. For example, if the CRC procedure is successful for an information block other than the block that is the focus of the sliding window 315, the decoding device may fix (e.g., set) the set of bits of the successful information block 305 so that the bits will not be changed in future iterations or sliding widows. For example, if the decoding device performs a successful CRC procedure for block Y3 during the first sliding window 315 (where Y1 is the focus of the first sliding window), then the decoding procedure may fix the bits included in block Y3 and proceed with the decoding procedure. Accordingly, upon reaching the third sliding window, in which fixed Y3 is the focus, the decoding device may output X3 without performing any iterations. In some cases, the decoding device may perform less than one full iteration of the third sliding window, a full iteration, or multiple iterations prior to outputting X3. In some cases, during the third sliding window 315, the decoding device may determine that the bits in Y3 are fixed, are correct, or a combination thereof which may prompt the decoding device to output X3. In some implementations, the decoding device may output X3 based on performing a successful CRC procedure on Y3 during the third sliding window, or regardless of performing a successful CRC procedure on Y3 during the third sliding window.

Figure 4A:
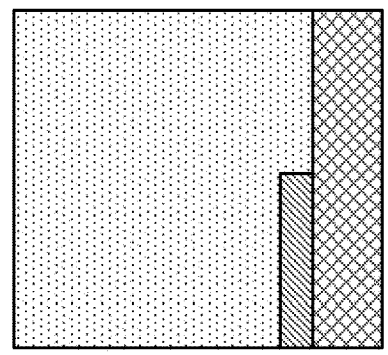
FIGS. 4A, 4B, and 4C illustrates examples of information block formats that support techniques for implementing an iterative coding procedure in accordance with aspects of the present disclosure.
Figure 4B:
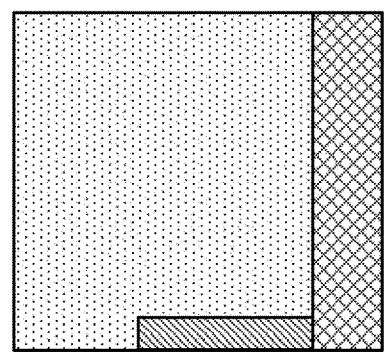
Figure 4C:
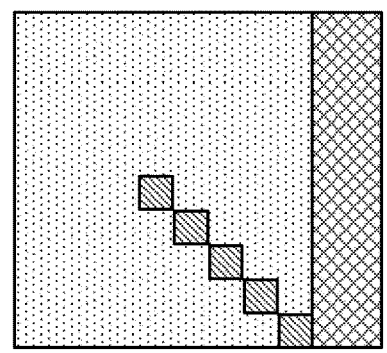

FIGS. 4A, 4B, and 4C illustrate examples of information block formats 400, 401, and 402, respectively that support techniques for implementing an iterative coding procedure in accordance with aspects of the present disclosure. The information block formats 400, 401, and 402 may be supported by a wireless device (e.g., a transmitting device, a receive device), where the wireless device may be a UE, a network entity, a network node, or some other network device. The wireless device may be an example of a device as described with reference to FIGS. 1 through 3.

As described herein, a transmitting device may include CRC bits in an encoded signal. The encoded signal may include one or more information blocks, each including a set of one or more information bits 405, a set of one or more parity bits 410, and a set of one or more CRC bits 420. In some cases, the transmitting device may determine a configuration for incorporating the CRC bits into an information block. In some cases, the determination may be dynamic, such that the transmitting device may determine for each information block or for each signal (including multiple information blocks) a format to use. In some cases, the determination may be static such that the transmitting device may be configured to use a same format for all information blocks. In some cases, the determination may be semi-static, in which the transmitting device may determine a format to use for one signal, multiple signals, etc. The receiving device may autonomously determine which format to use, or receive an indication (e.g., such as from a serving network entity) of which format to use (e.g., in RRC, DCI, MAC-CE, etc.), be preconfigured with which format to use, etc. In some cases, devices in communications with another (e.g., a transmitting device and a receiving device) may agree on a format together. In some cases, the transmitting device may select the format and may indicate the selected format to one or more receiving devices. In some cases, the receiving device may select the format and indicate the selected format to the transmitting device. In some cases, in accordance with the determined configuration, the transmitting device may be configured to include 16 CRC bits, 24 CRC bits, 32 CRC bits, or any other number of CRC bits 420.

In one example, an information block format may be configured in accordance with FIG. 4A (e.g., information block format 400). In accordance with information block format 400, the transmitting device may be configured to include all CRC bits 420 into one column of the information block. In such cases, all the CRC bits 420 of an information block are configured in one component FEC code. The CRC bits 420 may be included in the first column of the information block, the last column of the information block, or in any column of the information block. In some cases, the CRC bits 420 may extend an entire row of the information block. In some cases, the CRC bits 420 may extend a partial row of the information block. In such cases, the CRC bits 420 may start at a first row, end at a last row, or be placed somewhere in between. The CRC bits 420 may be adjacent to each other (as depicted), or may be spaced apart. For example, one or more information bits 405 may be placed in between two CRC bits 420.

In another example, an information block format may be configured in accordance with FIG. 4B (e.g., information block format 401). In accordance with information block format 401, the transmitting device may be configured to include all CRC bits 420 into one row of the information block. In such cases, all the CRC bits 420 of an information block are configured in one component FEC code. The CRC bits 420 may be included in the first row of the information block, the last row of the information block, or in any row of the information block. In some cases, the CRC bits 420 may extend an entire row of the information block. In some cases, the CRC bits 420 may extend a partial row of the information block. In such cases, the CRC bits 420 may start at a first column, end at a last column, or be placed somewhere in between. The CRC bits 420 may be adjacent to each other (as depicted), or may be spaced apart. For example, one or more information bits 405 may be placed in between two CRC bits 420.

In another example, an information block format may be configured in accordance with FIG. 4C (e.g., information block format 402). In accordance with information block format 402, the transmitting device may be configured to include the CRC bits 420 in an information block, such that each column and each row of the information block has no more than 1 CRC bit 420. In some cases, the transmitting device may be configured to include only one CRC bit 420 each column and each row of the information block, such that every row and every column each includes only one CRC bit 420. In such cases, each component FEC code has no more than 1 CRC bit 420. In some cases, the CRC bits 420 may be configured to start at the first information row and/or information column of the information block and/or to end at the last information row and/or column of the information block. The CRC bits 420 may be configured in the main diagonal of the information block, where the main diagonal extends corner to corner of the information block, or in some other diagonal of the information block. In some cases, the CRC bits 420 may extend an entire diagonal of the information block. In some cases, the CRC bits 420 may extend a partial diagonal of the information block (as depicted in FIG. 4C). In such cases, the CRC bits 420 may start at a first column, end at a last column (as depicted), or be placed somewhere in between. The CRC bits 420 may be adjacent to each other (as depicted in the diagonal of FIG. 4C), or may be spaced apart. For example, one or more information bits 405 may be placed in between two CRC bits 420 (in the diagonal).

It should be understood that the example information blocks formats described in FIGS. 4A, 4B, and 4C are merely examples, and that the CRC bits 420 may be included in an information block in any number of ways. For example, the formats described in FIGS. 4A, 4B, and/or 4C may be combined.

Figure 5:
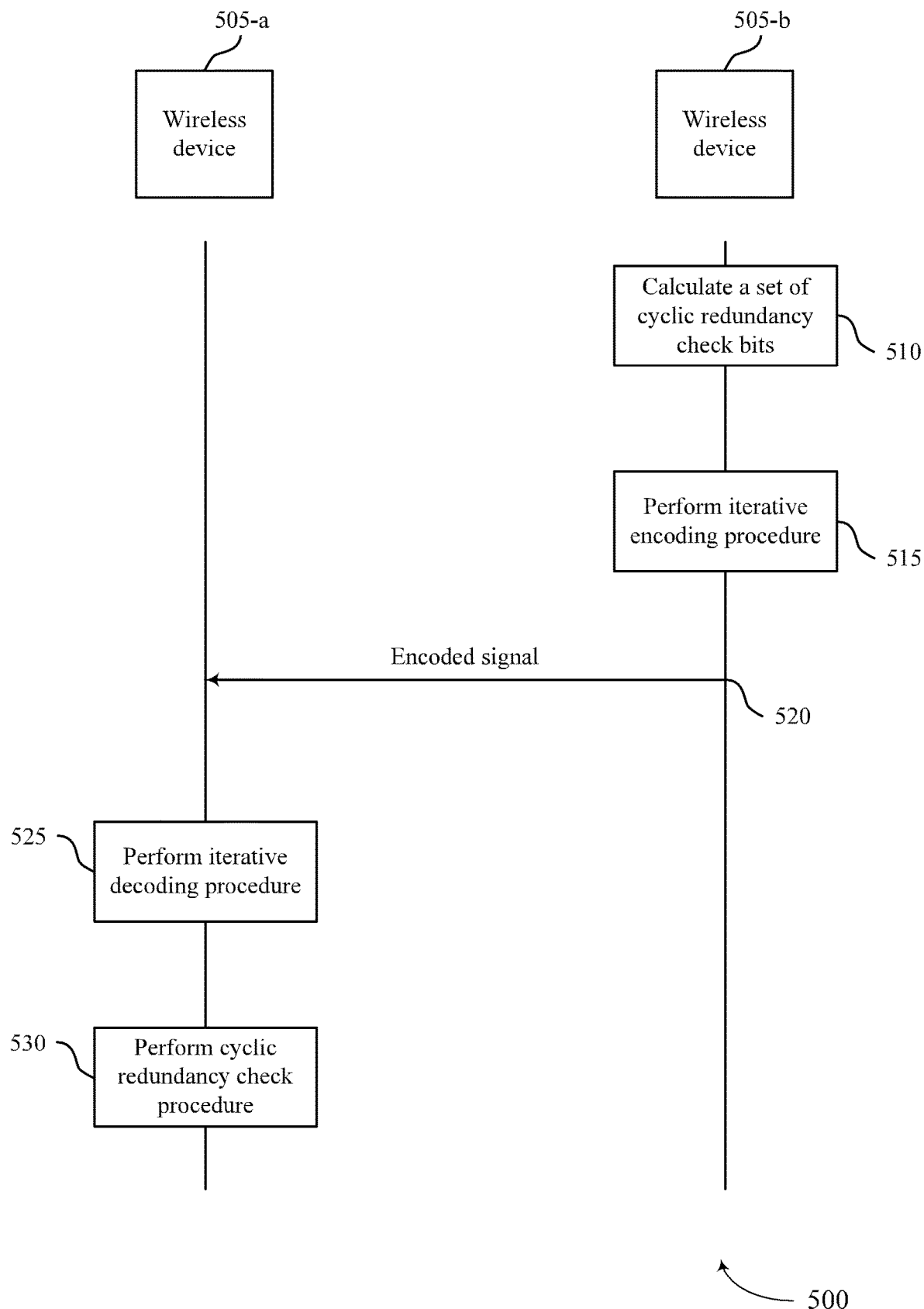
FIG. 5 illustrates an example of a process flow that supports techniques for implementing an iterative coding procedure in accordance with aspects of the present disclosure.

FIG. 5 illustrates an example of a process flow 500 that supports techniques for implementing an iterative coding procedure in accordance with aspects of the present disclosure. The process flow 500 may illustrate an example iterative decoding procedure performed by wireless device 505-a and/or wireless device 505-b. For example, wireless device 505-b may iteratively code a signal and transmit the encoded signal to wireless device 505-a, which wireless device 505-a may iteratively decode. Wireless device 505-a and wireless device 505-b may be examples of the corresponding wireless devices described with reference to FIGS. 1 through 4C. Wireless device 505-a and wireless device 505-b may be examples of UEs, network entities, network nodes, or some other network device, and may be the same devices, or different devices. In some cases, instead of wireless device 505-b transmitting the encoded signal, wireless device 505-a may similarly encode and transmit the encoded signal, such as to wireless device 505-b. Alternative examples of the following may be implemented, where some steps are performed in a different order than described or are not performed at all. In some cases, steps may include additional features not mentioned below, or further steps may be added.

At 510, wireless device 505-b may calculate a set of CRC bits to include in each information block of a set of information blocks. In some cases, wireless device 505-b may arrange each CRC bit of the set of CRC bits in a single column of an information block of the set of information blocks. In some cases, wireless device 505-b may arrange each CRC bit of the set of CRC bits in a single row of an information block of the set of information blocks. In some cases, wireless device 505-b may arrange each CRC bit of the set of CRC bits such that each row and each column of an information block of the set of information blocks includes at most one CRC bit. The set of CRC bits included in each information block may include 16 bits, 24 bits, 32 bits, or some other number of bits.

At 515, wireless device 505-b may perform an iterative encoding procedure to encode a set of information bits for each information block of the set of information blocks. The iterative encoding procedure may be a staircase encoding procedure that includes row encoding and column encoding the set of information bits for each information block of the set of information blocks.

At 520, wireless device 505-b may transmit an encoded signal including the set of information blocks, where each information block of the set of information blocks may include at least the set of encoded information bits and the set of CRC bits.

Upon receiving the encoded signal and at 525, wireless device 505-a may perform an iterative decoding procedure to decode the set of encoded information bits of a selected information block that is part of a subset of the set of information blocks that is within a sliding window. The iterative decoding procedure may include one or more iterations of a decoding process applied to the subset of the set of information blocks. The iterative decoding procedure may be a staircase decoding procedure that includes performing row decoding and column decoding for the subset of the set of information blocks within the sliding window.

At 530, wireless device 505-a may perform, in between iterations of the iterative decoding procedure applied to the subset of the set of information blocks within the sliding window, a CRC procedure based on the set of CRC bits in individual ones of the subset of the set of information blocks. In some cases, wireless device 505-a may perform the iterative decoding procedure and the CRC procedure until an output for each information block of the set of information blocks is achieved.

In some cases, wireless device 505-a may identify that the selected information block successfully passes the CRC procedure, and identify an output for the selected information block based on the CRC procedure for the selected information block being successful. The output may include a set of decoded information bits. Wireless device 505-a may determine that the selected information block successfully passes the CRC procedure after less than a predetermined maximum number of the one or more iterations of the decoding process. In such cases, 505-aa may refrain to perform a remaining number of the one or more iterations of the decoding process based on the selected information block successfully passing the CRC procedure before the predetermined maximum number of the one or more iterations is performed. In some cases, wireless device 505-a may move the sliding window to select a next information block of the set of information blocks and to include a second subset of the set of information blocks to perform the iterative decoding procedure to decode the set of encoded information bits of the next information block that is part of a second subset of the set of information blocks. Moving the sliding window may be based on the CRC procedure for the selected information block being successful.

Wireless device 505-a may identify that the selected information block fails to successfully pass the CRC procedure, and perform a next iteration of the one or more iterations of the decoding process based on the CRC procedure of the selected information block being unsuccessful.

In some cases, wireless device 505-a may identify that a first information block of the subset of the set of information blocks other than the selected information block successfully passes the CRC procedure. In such cases wireless device 505-a may configure the first information block to fix at least a set of decoded information bits in the first information block. The fixed set of decoded information bits may remain unchanged for a remainder of the iterative decoding procedure. Fixing the set of decoded information bits in the first information block may be based on the CRC procedure of the first information block being successful.

Figure 6:
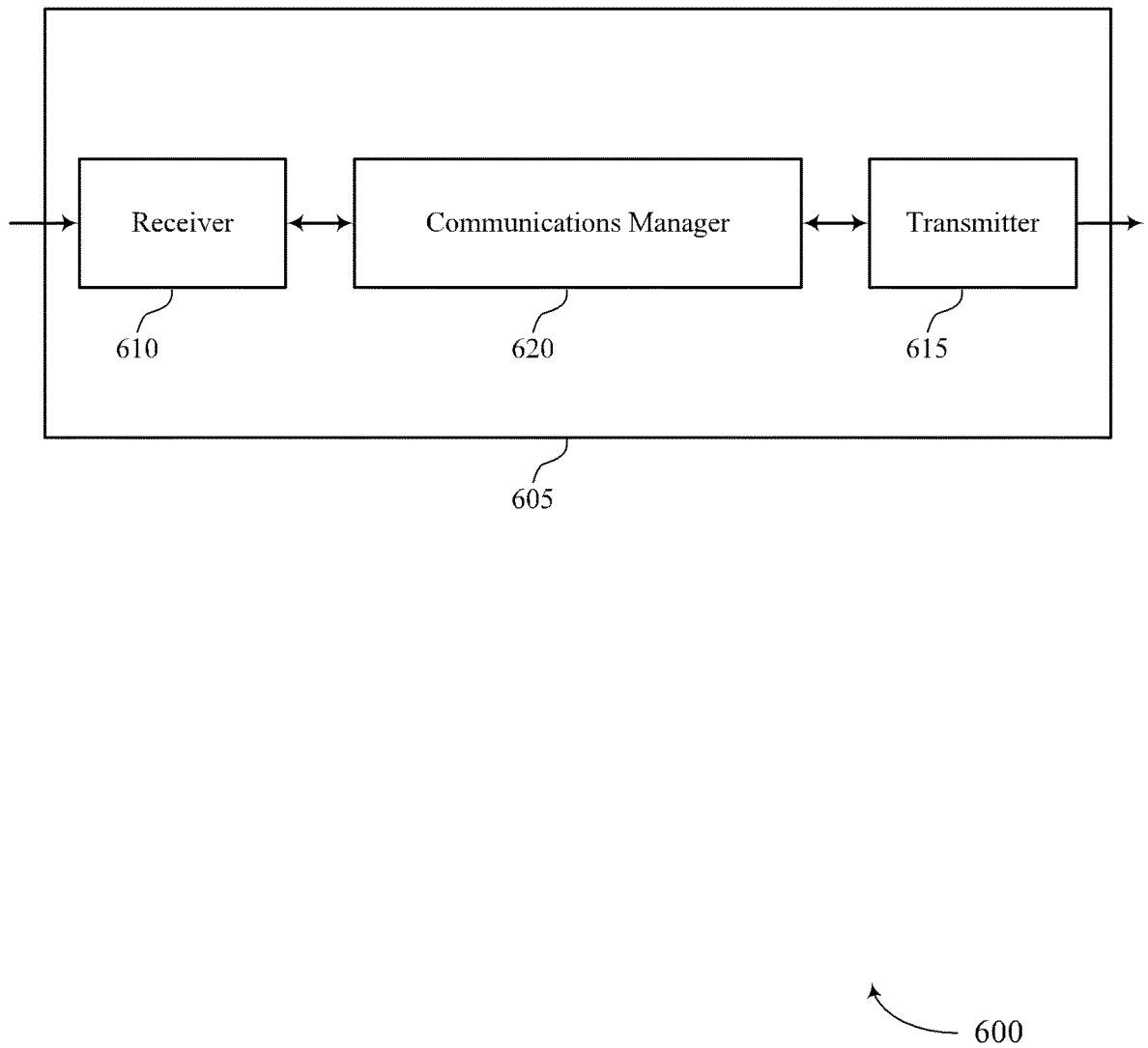
FIGS. 6 and 7 show block diagrams of devices that support techniques for implementing an iterative coding procedure in accordance with aspects of the present disclosure.

FIG. 6 shows a block diagram 600 of a device 605 that supports techniques for implementing an iterative coding procedure in accordance with aspects of the present disclosure. The device 605 may be an example of aspects of a network entity as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for implementing an iterative coding procedure). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for implementing an iterative coding procedure). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for implementing an iterative coding procedure as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a receiving device in accordance with examples as disclosed herein. For example, the communications manager 620 may be configured as or otherwise support a means for receiving an encoded signal including a set of information blocks, where each information block of the set of information blocks includes a set of encoded information bits and a set of CRC bits. The communications manager 620 may be configured as or otherwise support a means for performing a staircase decoding procedure to decode the set of encoded information bits of a selected information block that is part of a subset of the set of information blocks that is within a sliding window, the staircase decoding procedure including one or more iterations of a decoding process applied to the subset of the set of information blocks. The communications manager 620 may be configured as or otherwise support a means for performing, in between iterations of the staircase decoding procedure applied to the subset of the set of information blocks within the sliding window, a CRC procedure based on the set of CRC bits in individual ones of the subset of the set of information blocks.

Additionally, or alternatively, the communications manager 620 may support wireless communications at a transmitting device in accordance with examples as disclosed herein. For example, the communications manager 620 may be configured as or otherwise support a means for calculating a set of CRC bits to include in each information block of a set of information blocks. The communications manager 620 may be configured as or otherwise support a means for performing a staircase encoding procedure to encode a set of information bits for each information block of the set of information blocks. The communications manager 620 may be configured as or otherwise support a means for transmitting an encoded signal including the set of information blocks, where each information block of the set of information blocks includes at least the set of encoded information bits and the set of CRC bits.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, and more efficient utilization of communication resources.

Figure 7:
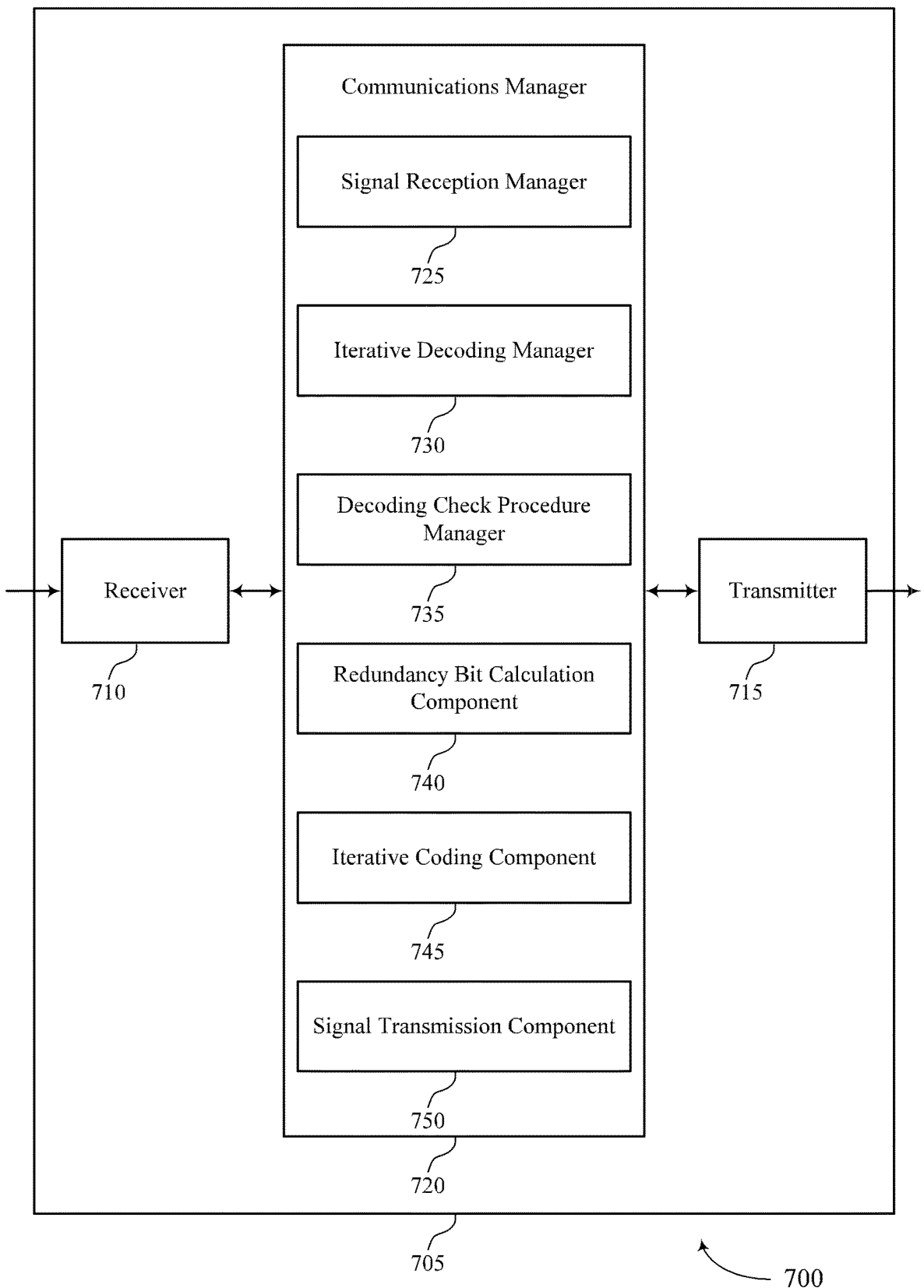

FIG. 7 shows a block diagram 700 of a device 705 that supports techniques for implementing an iterative coding procedure in accordance with aspects of the present disclosure. The device 705 may be an example of aspects of a device 605 or a network device 115 (e.g., a UE 115, a network entity) as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for implementing an iterative coding procedure). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for implementing an iterative coding procedure). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for implementing an iterative coding procedure as described herein. For example, the communications manager 720 may include a signal reception manager 725, an iterative decoding manager 730, a decoding check procedure manager 735, a redundancy bit calculation component 740, an iterative coding component 745, a signal transmission component 750, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a receiving device in accordance with examples as disclosed herein. The signal reception manager 725 may be configured as or otherwise support a means for receiving an encoded signal including a set of information blocks, where each information block of the set of information blocks includes a set of encoded information bits and a set of CRC bits. The iterative decoding manager 730 may be configured as or otherwise support a means for performing a staircase decoding procedure to decode the set of encoded information bits of a selected information block that is part of a subset of the set of information blocks that is within a sliding window, the staircase decoding procedure including one or more iterations of a decoding process applied to the subset of the set of information blocks. The decoding check procedure manager 735 may be configured as or otherwise support a means for performing, in between iterations of the staircase decoding procedure applied to the subset of the set of information blocks within the sliding window, a CRC procedure based on the set of CRC bits in individual ones of the subset of the set of information blocks.

Additionally, or alternatively, the communications manager 720 may support wireless communications at a transmitting device in accordance with examples as disclosed herein. The redundancy bit calculation component 740 may be configured as or otherwise support a means for calculating a set of CRC bits to include in each information block of a set of information blocks. The iterative coding component 745 may be configured as or otherwise support a means for performing a staircase encoding procedure to encode a set of information bits for each information block of the set of information blocks. The signal transmission component 750 may be configured as or otherwise support a means for transmitting an encoded signal including the set of information blocks, where each information block of the set of information blocks includes at least the set of encoded information bits and the set of CRC bits.

Figure 8:
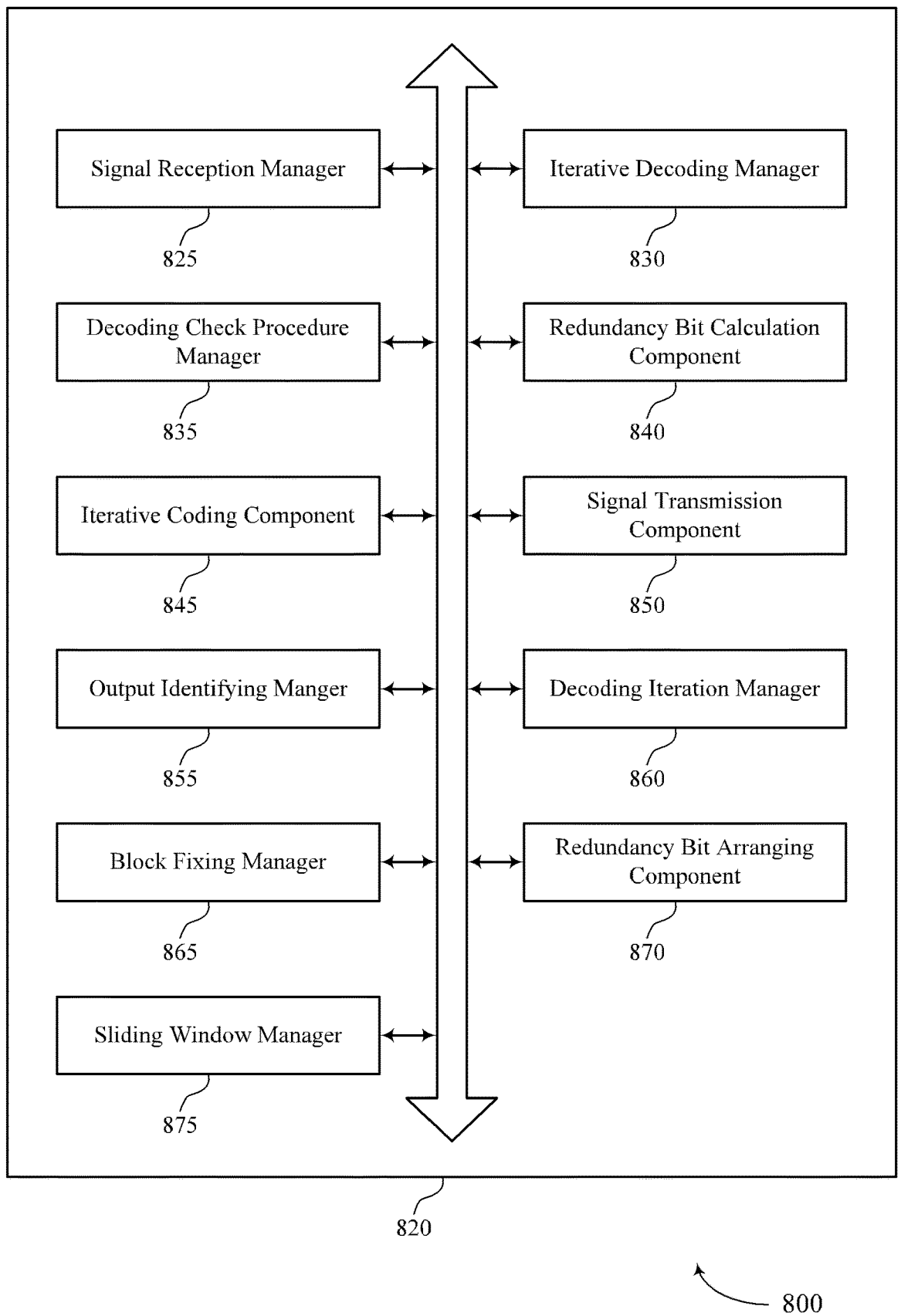
FIG. 8 shows a block diagram of a communications manager that supports techniques for implementing an iterative coding procedure in accordance with aspects of the present disclosure.

FIG. 8 shows a block diagram 800 of a communications manager 820 that supports techniques for implementing an iterative coding procedure in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for implementing an iterative coding procedure as described herein. For example, the communications manager 820 may include a signal reception manager 825, an iterative decoding manager 830, a decoding check procedure manager 835, a redundancy bit calculation component 840, an iterative coding component 845, a signal transmission component 850, an output identifying manager 855, a decoding iteration manager 860, a block fixing manager 865, a redundancy bit arranging component 870, a sliding window manager 875, or any combination thereof. Each of these components may communicate, directly or indirectly, with one another (e.g., via one or more buses).

The communications manager 820 may support wireless communications at a receiving device in accordance with examples as disclosed herein. The signal reception manager 825 may be configured as or otherwise support a means for receiving an encoded signal including a set of information blocks, where each information block of the set of information blocks includes a set of encoded information bits and a set of CRC bits. The iterative decoding manager 830 may be configured as or otherwise support a means for performing a staircase decoding procedure to decode the set of encoded information bits of a selected information block that is part of a subset of the set of information blocks that is within a sliding window, the staircase decoding procedure including one or more iterations of a decoding process applied to the subset of the set of information blocks. The decoding check procedure manager 835 may be configured as or otherwise support a means for performing, in between iterations of the staircase decoding procedure applied to the subset of the set of information blocks within the sliding window, a CRC procedure based on the set of CRC bits in individual ones of the subset of the set of information blocks.

In some examples, the decoding check procedure manager 835 may be configured as or otherwise support a means for identifying that the selected information block successfully passes the CRC procedure. In some examples, the output identifying manager 855 may be configured as or otherwise support a means for identifying an output for the selected information block based on the CRC procedure for the selected information block being successful, where the output includes a set of decoded information bits.

In some examples, the decoding check procedure manager 835 may be configured as or otherwise support a means for determining that the selected information block successfully passes the CRC procedure after less than a predetermined maximum number of the one or more iterations of the decoding process. In some examples, the decoding iteration manager 860 may be configured as or otherwise support a means for refraining to perform a remaining number of the one or more iterations of the decoding process based on the selected information block successfully passing the CRC procedure before the predetermined maximum number of the one or more iterations is performed.

In some examples, the sliding window manager 875 may be configured as or otherwise support a means for moving the sliding window to select a next information block of the set of information blocks and to include a second subset of the set of information blocks to perform the staircase decoding procedure to decode the set of encoded information bits of the next information block that is part of a second subset of the set of information blocks, where moving the sliding window is based on the CRC procedure for the selected information block being successful.

In some examples, the decoding check procedure manager 835 may be configured as or otherwise support a means for identifying that the selected information block fails to successfully pass the CRC procedure. In some examples, the decoding iteration manager 860 may be configured as or otherwise support a means for performing a next iteration of the one or more iterations of the decoding process based on the CRC procedure of the selected information block being unsuccessful.

In some examples, the decoding check procedure manager 835 may be configured as or otherwise support a means for identifying that a first information block of the subset of the set of information blocks other than the selected information block successfully passes the CRC procedure. In some examples, the block fixing manager 865 may be configured as or otherwise support a means for configuring the first information block to fix at least a set of decoded information bits in the first information block, the fixed set of decoded information bits to remain unchanged for a remainder of the staircase decoding procedure, where fixing the set of decoded information bits in the first information block is based on the CRC procedure of the first information block being successful.

In some examples, to support performing the staircase decoding procedure and the CRC procedure, the iterative decoding manager 830 may be configured as or otherwise support a means for performing the staircase decoding procedure and the CRC procedure until an output for each information block of the set of information blocks is achieved.

In some examples, each CRC bit of the set of CRC bits are arranged in a single column of the selected information block.

In some examples, each CRC bit of the set of CRC bits are arranged in a single row of the selected information block.

In some examples, each CRC bit of the set of CRC bits are arranged such that each row and each column of an information block of the set of information blocks includes at most one CRC bit.

In some examples, the set of CRC bits included in each information block includes 16 bits, 24 bits, or 32 bits.

In some examples, the staircase decoding procedure includes performing row decoding and column decoding for the subset of the set of information blocks within the sliding window.

Additionally, or alternatively, the communications manager 820 may support wireless communications at a transmitting device in accordance with examples as disclosed herein. The redundancy bit calculation component 840 may be configured as or otherwise support a means for calculating a set of CRC bits to include in each information block of a set of information blocks. The iterative coding component 845 may be configured as or otherwise support a means for performing a staircase encoding procedure to encode a set of information bits for each information block of the set of information blocks. The signal transmission component 850 may be configured as or otherwise support a means for transmitting an encoded signal including the set of information blocks, where each information block of the set of information blocks includes at least the set of encoded information bits and the set of CRC bits.

In some examples, the redundancy bit arranging component 870 may be configured as or otherwise support a means for arranging each CRC bit of the set of CRC bits in a single column of an information block of the set of information blocks.

In some examples, the redundancy bit arranging component 870 may be configured as or otherwise support a means for arranging each CRC bit of the set of CRC bits in a single row of an information block of the set of information blocks.

In some examples, the redundancy bit arranging component 870 may be configured as or otherwise support a means for arranging each CRC bit of the set of CRC bits such that each row and each column of an information block of the set of information blocks includes at most one CRC bit.

In some examples, the set of CRC bits included in each information block includes 16 bits, 24 bits, or 32 bits.

In some examples, the staircase encoding procedure includes row encoding and column encoding the set of information bits for each information block of the set of information blocks.

Figure 9:
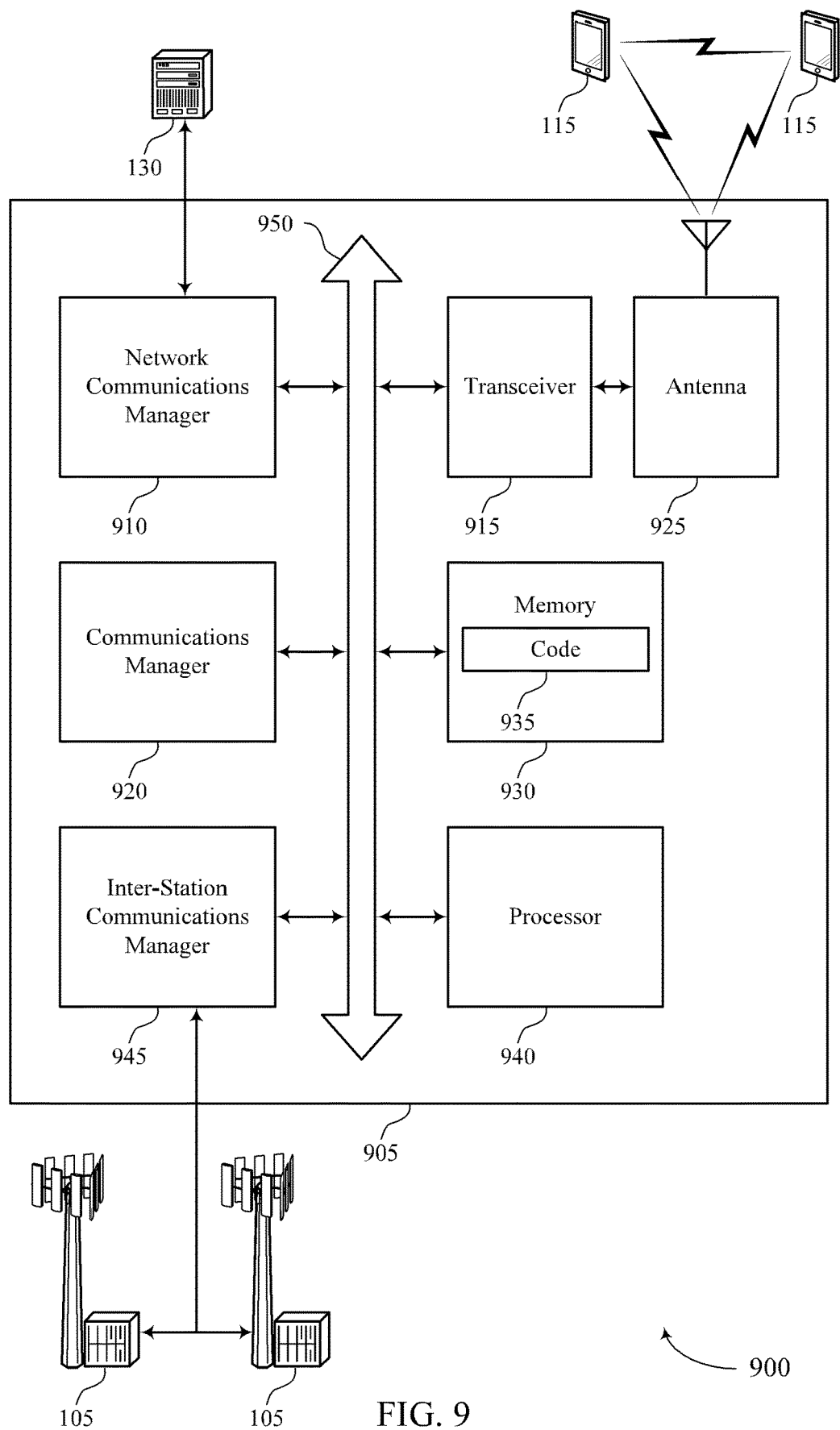
FIG. 9 shows a diagram of a system including a device that supports techniques for implementing an iterative coding procedure in accordance with aspects of the present disclosure.

FIG. 9 shows a diagram of a system 900 including a device 905 that supports techniques for implementing an iterative coding procedure in accordance with aspects of the present disclosure. The device 905 may be an example of or include the components of a device 605, a device 705, or a network entity as described herein. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for implementing an iterative coding procedure). For example, the device 905 or a component of the device 905 may include a processor 940 and memory 930 coupled to the processor 940, the processor 940 and memory 930 configured to perform various functions described herein.

The inter-station communications manager 945 may manage communications with other network entities 105, and may include a controller or scheduler for controlling communications with UEs 115 in cooperation with other network entities 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between network entities 105.

The communications manager 920 may support wireless communications at a receiving device in accordance with examples as disclosed herein. For example, the communications manager 920 may be configured as or otherwise support a means for receiving an encoded signal including a set of information blocks, where each information block of the set of information blocks includes a set of encoded information bits and a set of CRC bits. The communications manager 920 may be configured as or otherwise support a means for performing a staircase decoding procedure to decode the set of encoded information bits of a selected information block that is part of a subset of the set of information blocks that is within a sliding window, the staircase decoding procedure including one or more iterations of a decoding process applied to the subset of the set of information blocks. The communications manager 920 may be configured as or otherwise support a means for performing, in between iterations of the staircase decoding procedure applied to the subset of the set of information blocks within the sliding window, a CRC procedure based on the set of CRC bits in individual ones of the subset of the set of information blocks.

Additionally, or alternatively, the communications manager 920 may support wireless communications at a transmitting device in accordance with examples as disclosed herein. For example, the communications manager 920 may be configured as or otherwise support a means for calculating a set of CRC bits to include in each information block of a set of information blocks. The communications manager 920 may be configured as or otherwise support a means for performing a staircase encoding procedure to encode a set of information bits for each information block of the set of information blocks. The communications manager 920 may be configured as or otherwise support a means for transmitting an encoded signal including the set of information blocks, where each information block of the set of information blocks includes at least the set of encoded information bits and the set of CRC bits.

By including or configuring the communications manager 920 in accordance with examples as described herein, the device 905 may support techniques for reduced latency, improved user experience related to reduced processing, reduced power consumption, more efficient utilization of communication resources, improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for implementing an iterative coding procedure as described herein, or the processor 940 and the memory 930 may be otherwise configured to perform or support such operations.

Figure 10:
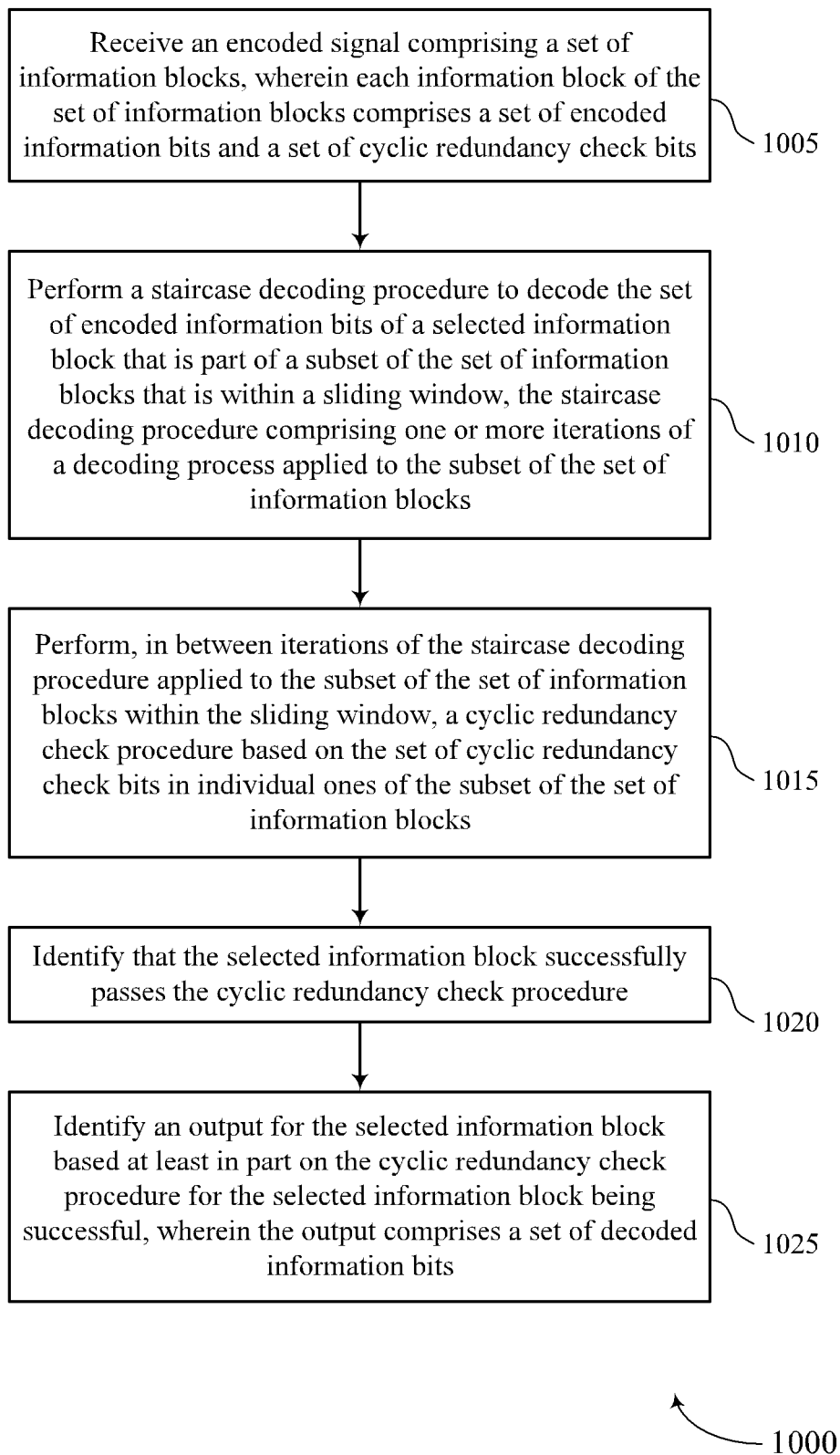
FIGS. 10 through 12 show flowcharts illustrating methods that support techniques for implementing an iterative coding procedure in accordance with aspects of the present disclosure.

FIG. 10 shows a flowchart illustrating a method 1000 that supports techniques for implementing an iterative coding procedure in accordance with aspects of the present disclosure. The operations of the method 1000 may be implemented by a network entity or its components as described herein. For example, the operations of the method 1000 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1005, the method may include receiving an encoded signal including a set of information blocks, where each information block of the set of information blocks includes a set of encoded information bits and a set of CRC bits. The operations of 1005 may be performed in accordance with examples as disclosed herein. In some examples, aspects of the operations of 1005 may be performed by a signal reception manager 825 as described with reference to FIG. 8.

At 1010, the method may include performing a staircase decoding procedure to decode the set of encoded information bits of a selected information block that is part of a subset of the set of information blocks that is within a sliding window, the staircase decoding procedure including one or more iterations of a decoding process applied to the subset of the set of information blocks. The operations of 1010 may be performed in accordance with examples as disclosed herein. In some examples, aspects of the operations of 1010 may be performed by an iterative decoding manager 830 as described with reference to FIG. 8.

At 1015, the method may include performing, in between iterations of the staircase decoding procedure applied to the subset of the set of information blocks within the sliding window, a CRC procedure based on the set of CRC bits in individual ones of the subset of the set of information blocks. The operations of 1015 may be performed in accordance with examples as disclosed herein. In some examples, aspects of the operations of 1015 may be performed by a decoding check procedure manager 835 as described with reference to FIG. 8.

At 1020, the method may include identifying that the selected information block successfully passes the CRC procedure. The operations of 1020 may be performed in accordance with examples as disclosed herein. In some examples, aspects of the operations of 1020 may be performed by a decoding check procedure manager 835 as described with reference to FIG. 8.

At 1025, the method may include identifying an output for the selected information block based on the CRC procedure for the selected information block being successful, where the output includes a set of decoded information bits. The operations of 1025 may be performed in accordance with examples as disclosed herein. In some examples, aspects of the operations of 1025 may be performed by an output identifying manager 855 as described with reference to FIG. 8.

Figure 11:
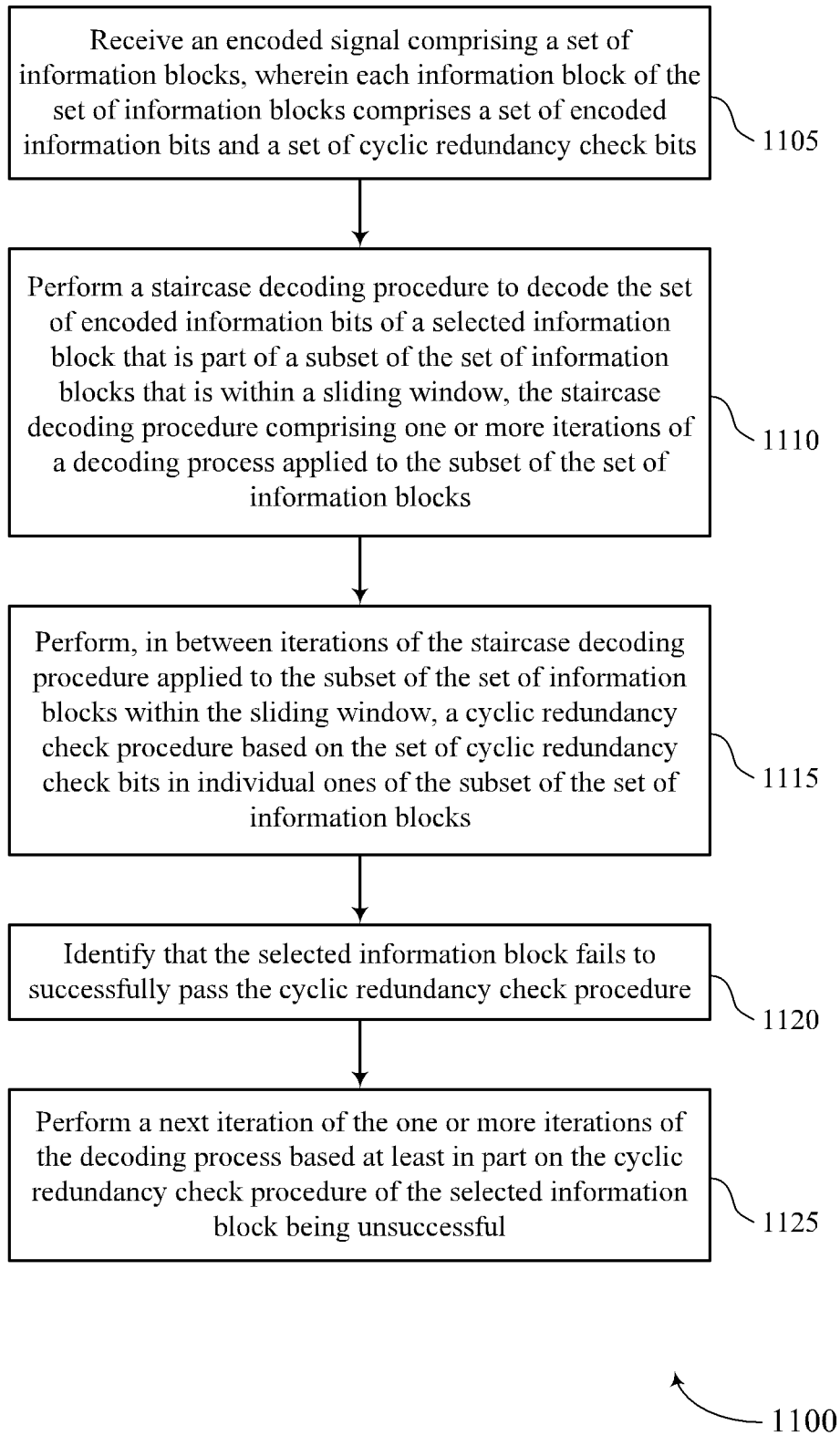

FIG. 11 shows a flowchart illustrating a method 1100 that supports techniques for implementing an iterative coding procedure in accordance with aspects of the present disclosure. The operations of the method 1100 may be implemented by a network entity or its components as described herein. For example, the operations of the method 1100 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1105, the method may include receiving an encoded signal including a set of information blocks, where each information block of the set of information blocks includes a set of encoded information bits and a set of CRC bits. The operations of 1105 may be performed in accordance with examples as disclosed herein. In some examples, aspects of the operations of 1105 may be performed by a signal reception manager 825 as described with reference to FIG. 8.

At 1110, the method may include performing a staircase decoding procedure to decode the set of encoded information bits of a selected information block that is part of a subset of the set of information blocks that is within a sliding window, the staircase decoding procedure including one or more iterations of a decoding process applied to the subset of the set of information blocks. The operations of 1110 may be performed in accordance with examples as disclosed herein. In some examples, aspects of the operations of 1110 may be performed by an iterative decoding manager 830 as described with reference to FIG. 8.

At 1115, the method may include performing, in between iterations of the staircase decoding procedure applied to the subset of the set of information blocks within the sliding window, a CRC procedure based on the set of CRC bits in individual ones of the subset of the set of information blocks. The operations of 1115 may be performed in accordance with examples as disclosed herein. In some examples, aspects of the operations of 1115 may be performed by a decoding check procedure manager 835 as described with reference to FIG. 8.

At 1120, the method may include identifying that the selected information block fails to successfully pass the CRC procedure. The operations of 1120 may be performed in accordance with examples as disclosed herein. In some examples, aspects of the operations of 1120 may be performed by a decoding check procedure manager 835 as described with reference to FIG. 8.

At 1125, the method may include performing a next iteration of the one or more iterations of the decoding process based on the CRC procedure of the selected information block being unsuccessful. The operations of 1125 may be performed in accordance with examples as disclosed herein. In some examples, aspects of the operations of 1125 may be performed by a decoding iteration manager 860 as described with reference to FIG. 8.

Figure 12:
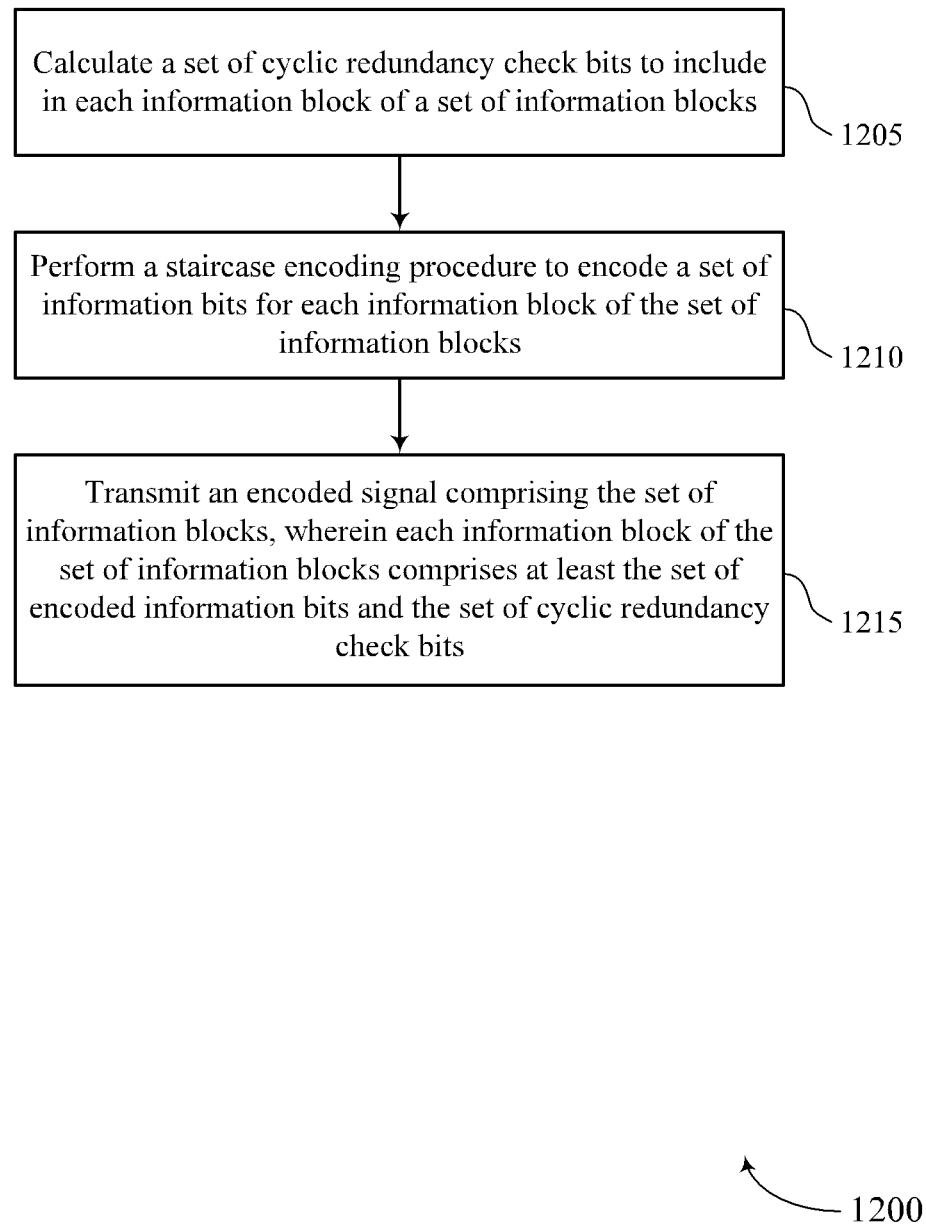

FIG. 12 shows a flowchart illustrating a method 1200 that supports techniques for implementing an iterative coding procedure in accordance with aspects of the present disclosure. The operations of the method 1200 may be implemented by a network entity or its components as described herein. For example, the operations of the method 1200 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1205, the method may include calculating a set of CRC bits to include in each information block of a set of information blocks. The operations of 1205 may be performed in accordance with examples as disclosed herein. In some examples, aspects of the operations of 1205 may be performed by a redundancy bit calculation component 840 as described with reference to FIG. 8.

At 1210, the method may include performing a staircase encoding procedure to encode a set of information bits for each information block of the set of information blocks. The operations of 1210 may be performed in accordance with examples as disclosed herein. In some examples, aspects of the operations of 1210 may be performed by an iterative coding component 845 as described with reference to FIG. 8.

At 1215, the method may include transmitting an encoded signal including the set of information blocks, where each information block of the set of information blocks includes at least the set of encoded information bits and the set of CRC bits. The operations of 1215 may be performed in accordance with examples as disclosed herein. In some examples, aspects of the operations of 1215 may be performed by a signal transmission component 850 as described with reference to FIG. 8.

The following provides an overview of aspects of the present disclosure:

Aspect 1: A method for wireless communications at a receiving device, comprising: receiving an encoded signal comprising a set of information blocks, wherein each information block of the set of information blocks comprises a set of encoded information bits and a set of cyclic redundancy check bits; performing a staircase decoding procedure to decode the set of encoded information bits of a selected information block that is part of a subset of the set of information blocks that is within a sliding window, the staircase decoding procedure comprising one or more iterations of a decoding process applied to the subset of the set of information blocks; and performing, in between iterations of the staircase decoding procedure applied to the subset of the set of information blocks within the sliding window, a cyclic redundancy check procedure based on the set of cyclic redundancy check bits in individual ones of the subset of the set of information blocks.

Aspect 2: The method of aspect 1, further comprising: identifying that the selected information block successfully passes the cyclic redundancy check procedure; and identifying an output for the selected information block based at least in part on the cyclic redundancy check procedure for the selected information block being successful, wherein the output comprises a set of decoded information bits.

Aspect 3: The method of aspect 2, further comprising: determining that the selected information block successfully passes the cyclic redundancy check procedure after less than a predetermined maximum number of the one or more iterations of the decoding process; and refraining to perform a remaining number of the one or more iterations of the decoding process based at least in part on the selected information block successfully passing the cyclic redundancy check procedure before the predetermined maximum number of the one or more iterations is performed.

Aspect 4: The method of any of aspects 2 through 3, further comprising: moving the sliding window to select a next information block of the set of information blocks and to include a second subset of the set of information blocks to perform the staircase decoding procedure to decode the set of encoded information bits of the next information block that is part of a second subset of the set of information blocks, wherein moving the sliding window is based at least in part on the cyclic redundancy check procedure for the selected information block being successful.

Aspect 5: The method of any of aspects 1 through 4, further comprising: identifying that the selected information block fails to successfully pass the cyclic redundancy check procedure; and performing a next iteration of the one or more iterations of the decoding process based at least in part on the cyclic redundancy check procedure of the selected information block being unsuccessful.

Aspect 6: The method of any of aspects 1 through 5, further comprising: identifying that a first information block of the subset of the set of information blocks other than the selected information block successfully passes the cyclic redundancy check procedure; and configuring the first information block to fix at least a set of decoded information bits in the first information block, the fixed set of decoded information bits to remain unchanged for a remainder of the staircase decoding procedure, wherein fixing the set of decoded information bits in the first information block is based at least in part on the cyclic redundancy check procedure of the first information block being successful.

Aspect 7: The method of any of aspects 1 through 6, wherein performing the staircase decoding procedure and the cyclic redundancy check procedure further comprises: performing the staircase decoding procedure and the cyclic redundancy check procedure until an output for each information block of the set of information blocks is achieved.

Aspect 8: The method of any of aspects 1 through 7, wherein each cyclic redundancy check bit of the set of cyclic redundancy check bits are arranged in a single column of the selected information block.

Aspect 9: The method of any of aspects 1 through 8, wherein each cyclic redundancy check bit of the set of cyclic redundancy check bits are arranged in a single row of the selected information block.

Aspect 10: The method of any of aspects 1 through 9, wherein each cyclic redundancy check bit of the set of cyclic redundancy check bits are arranged such that each row and each column of an information block of the set of information blocks includes at most one cyclic redundancy check bit.

Aspect 11: The method of any of aspects 1 through 10, wherein the set of cyclic redundancy check bits included in each information block comprises 16 bits, 24 bits, or 32 bits.

Aspect 12: The method of any of aspects 1 through 11, wherein the staircase decoding procedure includes performing row decoding and column decoding for the subset of the set of information blocks within the sliding window.

Aspect 13: A method for wireless communications at a transmitting device, comprising: calculating a set of cyclic redundancy check bits to include in each information block of a set of information blocks; performing a staircase encoding procedure to encode a set of information bits for each information block of the set of information blocks; and transmitting an encoded signal comprising the set of information blocks, wherein each information block of the set of information blocks comprises at least the set of encoded information bits and the set of cyclic redundancy check bits.

Aspect 14: The method of aspect 13, further comprising: arranging each cyclic redundancy check bit of the set of cyclic redundancy check bits in a single column of an information block of the set of information blocks.

Aspect 15: The method of any of aspects 13 through 14, further comprising: arranging each cyclic redundancy check bit of the set of cyclic redundancy check bits in a single row of an information block of the set of information blocks.

Aspect 16: The method of any of aspects 13 through 15, further comprising: arranging each cyclic redundancy check bit of the set of cyclic redundancy check bits such that each row and each column of an information block of the set of information blocks includes at most one cyclic redundancy check bit.

Aspect 17: The method of any of aspects 13 through 16, wherein the set of cyclic redundancy check bits included in each information block comprises 16 bits, 24 bits, or 32 bits.

Aspect 18: The method of any of aspects 13 through 17, wherein the staircase encoding procedure includes row encoding and column encoding the set of information bits for each information block of the set of information blocks.

Aspect 19: An apparatus for wireless communications, comprising a processor; memory coupled with the processor; and instructions stored in the memory and executable by the processor to cause the apparatus to perform a method of any of aspects 1 through 12.

Aspect 20: An apparatus for wireless communications, comprising at least one means for performing a method of any of aspects 1 through 12.

Aspect 21: A non-transitory computer-readable medium storing code for wireless communications, the code comprising instructions executable by a processor to perform a method of any of aspects 1 through 12.

Aspect 22: An apparatus for wireless communications, comprising a processor; memory coupled with the processor; and instructions stored in the memory and executable by the processor to cause the apparatus to perform a method of any of aspects 13 through 18.

Aspect 23: An apparatus for wireless communications, comprising at least one means for performing a method of any of aspects 13 through 18.

Aspect 24: A non-transitory computer-readable medium storing code for wireless communications, the code comprising instructions executable by a processor to perform a method of any of aspects 13 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a receiving device, comprising:
receiving, from a transmitting device, an encoded signal comprising a set of information blocks, wherein each information block of the set of information blocks comprises a set of encoded information bits and a set of cyclic redundancy check bits;
performing a staircase decoding procedure to decode the set of encoded information bits of a selected information block that is part of a subset of the set of information blocks that is within a sliding window, the staircase decoding procedure comprising a plurality of iterations of a decoding process applied to the subset of the set of information blocks;
performing, in between iterations of the staircase decoding procedure applied to the subset of the set of information blocks within the sliding window, a cyclic redundancy check procedure based on the set of cyclic redundancy check bits in individual ones of the subset of the set of information blocks;
setting, based on a success of the cyclic redundancy check procedure, one or more bits of an output that comprises a set of decoded information bits corresponding to the subset of the set of information blocks; and
refraining from performing remaining iterations of the staircase decoding procedure in response to setting the one or more bits of the output.

2. The method of claim 1, further comprising:
identifying that the selected information block successfully passes the cyclic redundancy check procedure; and
identifying an output for the selected information block based at least in part on the cyclic redundancy check procedure for the selected information block being successful, wherein the output for the selected information block comprises a second set of decoded information bits.

3. The method of claim 2, further comprising:
determining that the selected information block successfully passes the cyclic redundancy check procedure after less than a predetermined maximum number of the plurality of iterations of the decoding process; and
refraining to perform a remaining number of the plurality of iterations of the decoding process based at least in part on the selected information block successfully passing the cyclic redundancy check procedure before the predetermined maximum number of the plurality of iterations is performed.

4. The method of claim 2, further comprising:
moving the sliding window to select a next information block of the set of information blocks and to include a second subset of the set of information blocks to perform the staircase decoding procedure to decode the set of encoded information bits of the next information block that is part of the second subset of the set of information blocks, wherein moving the sliding window is based at least in part on the cyclic redundancy check procedure for the selected information block being successful.

5. The method of claim 1, further comprising:
identifying that the selected information block fails to successfully pass the cyclic redundancy check procedure; and
performing a next iteration of the plurality of iterations of the decoding process based at least in part on the cyclic redundancy check procedure of the selected information block being unsuccessful.

6. The method of claim 1, further comprising:
identifying that a first information block of the subset of the set of information blocks other than the selected information block successfully passes the cyclic redundancy check procedure; and
configuring the first information block to fix at least the one or more bits in the first information block, the one or more bits to remain unchanged for a remainder of the staircase decoding procedure, wherein fixing the one or more bits in the first information block is based at least in part on the cyclic redundancy check procedure of the first information block being successful.

7. The method of claim 1, wherein performing the staircase decoding procedure and the cyclic redundancy check procedure further comprises:
performing the staircase decoding procedure and the cyclic redundancy check procedure until an output for each information block of the set of information blocks is achieved.

8. The method of claim 1, wherein each cyclic redundancy check bit of the set of cyclic redundancy check bits are arranged in a single column of the selected information block.

9. The method of claim 1, wherein each cyclic redundancy check bit of the set of cyclic redundancy check bits are arranged in a single row of the selected information block.

10. The method of claim 1, wherein each cyclic redundancy check bit of the set of cyclic redundancy check bits are arranged such that each row and each column of an information block of the set of information blocks includes at most one cyclic redundancy check bit.

11. The method of claim 1, wherein the staircase decoding procedure includes performing row decoding and column decoding for the subset of the set of information blocks within the sliding window.

12. A method for wireless communications at a transmitting device, comprising:
calculating a set of cyclic redundancy check bits to include in each information block of a set of information blocks;
arranging each cyclic redundancy check bit of the set of cyclic redundancy check bits in a single column or a single row of an information block of the set of information blocks;
performing a staircase encoding procedure to encode a set of information bits for each information block of the set of information blocks; and
transmitting, to a receiving device, an encoded signal comprising the set of information blocks, wherein each information block of the set of information blocks comprises at least the set of encoded information bits and the set of cyclic redundancy check bits.

13. The method of claim 12, wherein the staircase encoding procedure includes row encoding and column encoding the set of information bits for each information block of the set of information blocks.

14. An apparatus for wireless communications, comprising:
a processor;
memory coupled with the processor; and
instructions stored in the memory and executable by the processor to cause the apparatus to:

receive, from a transmitting device, an encoded signal comprising a set of information blocks, wherein each information block of the set of information blocks comprises a set of encoded information bits and a set of cyclic redundancy check bits;

perform a staircase decoding procedure to decode the set of encoded information bits of a selected information block that is part of a subset of the set of information blocks that is within a sliding window, the staircase decoding procedure comprising a plurality of iterations of a decoding process applied to the subset of the set of information blocks;

perform, in between iterations of the staircase decoding procedure applied to the subset of the set of information blocks within the sliding window, a cyclic redundancy check procedure based on the set of cyclic redundancy check bits in individual ones of the subset of the set of information blocks;

set, based on a success of the cyclic redundancy check procedure, one or more bits of an output that comprises a set of decoded information bits corresponding to the subset of the set of information blocks; and refrain from performing remaining iterations of the staircase decoding procedure in response to setting the one or more bits of the output.

15. The apparatus of claim 14, wherein the instructions are further executable by the processor to cause the apparatus to:

identify that the selected information block successfully passes the cyclic redundancy check procedure; and identify an output for the selected information block based at least in part on the cyclic redundancy check procedure for the selected information block being successful, wherein the output for the selected information block comprises a second set of decoded information bits.

16. The apparatus of claim 15, wherein the instructions are further executable by the processor to cause the apparatus to:

determine that the selected information block successfully passes the cyclic redundancy check procedure after less than a predetermined maximum number of the plurality of iterations of the decoding process; and refrain to perform a remaining number of the plurality of iterations of the decoding process based at least in part on the selected information block successfully passing the cyclic redundancy check procedure before the predetermined maximum number of the plurality of iterations is performed.

17. The apparatus of claim 15, wherein the instructions are further executable by the processor to cause the apparatus to:

move the sliding window to select a next information block of the set of information blocks and to include a second subset of the set of information blocks to perform the staircase decoding procedure to decode the set of encoded information bits of the next information block that is part of the second subset of the set of information blocks, wherein moving the sliding window is based at least in part on the cyclic redundancy check procedure for the selected information block being successful.

18. The apparatus of claim 14, wherein the instructions are further executable by the processor to cause the apparatus to:

identify that the selected information block fails to successfully pass the cyclic redundancy check procedure; and perform a next iteration of the plurality of iterations of the decoding process based at least in part on the cyclic redundancy check procedure of the selected information block being unsuccessful.

19. The apparatus of claim 14, wherein the instructions are further executable by the processor to cause the apparatus to:

identify that a first information block of the subset of the set of information blocks other than the selected information block successfully passes the cyclic redundancy check procedure; and configure the first information block to fix at least the one or more bits in the first information block, the one or more bits to remain unchanged for a remainder of the staircase decoding procedure, wherein fixing the one or more bits in the first information block is based at least in part on the cyclic redundancy check procedure of the first information block being successful.

20. The apparatus of claim 14, wherein the instructions to perform the staircase decoding procedure and the cyclic redundancy check procedure are further executable by the processor to cause the apparatus to:

perform the staircase decoding procedure and the cyclic redundancy check procedure until an output for each information block of the set of information blocks is achieved.

21. The apparatus of claim 14, wherein the staircase decoding procedure includes performing row decoding and column decoding for the subset of the set of information blocks within the sliding window.

22. An apparatus for wireless communications, comprising:

a processor;

memory coupled with the processor; and instructions stored in the memory and executable by the processor to cause the apparatus to:

calculate a set of cyclic redundancy check bits to include in each information block of a set of information blocks;

arrange each cyclic redundancy check bit of the set of cyclic redundancy check bits in a single column or a single row of an information block of the set of information blocks;

perform a staircase encoding procedure to encode a set of information bits for each information block of the set of information blocks; and transmit, to a receiving device, an encoded signal comprising the set of information blocks, wherein each information block of the set of information blocks comprises at least the set of encoded information bits and the set of cyclic redundancy check bits.

23. The apparatus of claim 22, wherein the set of cyclic redundancy check bits included in each information block comprises 16 bits, 24 bits, or 32 bits.

24. The apparatus of claim 22, wherein the staircase encoding procedure that includes row encoding and column encoding the set of information bits for each information block of the set of information blocks.

* * * * *